(12) United States Patent
Hania

(10) Patent No.: US 11,477,435 B2
(45) Date of Patent: Oct. 18, 2022

(54) SYSTEM AND METHOD FOR BUILT IN TEST FOR OPTICAL SENSORS

(71) Applicant: RAIL VISION LTD., Ra'anana (IL)

(72) Inventor: Shahar Hania, Kedumim (IL)

(73) Assignee: RAIL VISION LTD., Ra'anana (IL)

( * ) Notice: Subject to any disclaimer, the term of this patent is extended or adjusted under 35 U.S.C. 154(b) by 34 days.

(21) Appl. No.: 16/975,774

(22) PCT Filed: Feb. 27, 2019

(86) PCT No.: PCT/IL2019/050224
§ 371 (c)(1),
(2) Date: Aug. 26, 2020

(87) PCT Pub. No.: WO2019/167044
PCT Pub. Date: Sep. 6, 2019

(65) Prior Publication Data
US 2020/0413036 A1 Dec. 31, 2020

Related U.S. Application Data

(60) Provisional application No. 62/636,210, filed on Feb. 28, 2018.

(51) Int. Cl.
*H04N 7/18* (2006.01)
*H04N 17/00* (2006.01)

(52) U.S. Cl.
CPC ........... *H04N 17/002* (2013.01); *H04N 7/188* (2013.01)

(58) Field of Classification Search
CPC .. H04N 17/002; H04N 7/188; H04N 5/23229; H04N 5/247; H04N 5/2171;
(Continued)

(56) References Cited

U.S. PATENT DOCUMENTS 5,692,065 A 11/1997 Prakash et al.
6,121,893 A * 9/2000 Park ...................... G08C 23/04
340/12.22
(Continued)

FOREIGN PATENT DOCUMENTS

EP 1 334 888 8/2003

OTHER PUBLICATIONS

Search Report of International Application No. PCT/IL2019/050224 dated Jun. 12, 2019.
(Continued)

*Primary Examiner* — Paulos M Natnael
(74) *Attorney, Agent, or Firm* — Pearl Cohen Zedek Latzer Baratz LLP

(57) ABSTRACT

An optical system including one or more optical sensors and a processing unit capable of performing built-in tests of the optical sensor(s) and methods thereof are disclosed. The processing unit includes a built-in test module configured to detect a reduction of an optical quality of at least some of the images generated by at least one of the optical sensors with respect to an expected optical quality thereof. The built-in test module may be configured to determine whether the reduction of the optical quality thereof is due to the "external optical disturbances" (EOD) and/or failure of the optical sensor(s)/system. The processing unit may include a relative built-in test module configured to compare at least some images generated by at least two of the optical sensor(s) and to determine which of the at least two optical sensors thereof, if any, is subjected to at least one of the EOD and/or failure.

14 Claims, 13 Drawing Sheets

(58) Field of Classification Search
CPC ..... H04N 17/00; B61L 15/0081; B61L 23/04; B61L 23/041
See application file for complete search history.

(56) References Cited

U.S. PATENT DOCUMENTS

| | | |
|---|---|---|
| 2007/0126869 A1 | 6/2007 | Montminy et al. |
| 2009/0185760 A1* | 7/2009 | Okada ................ G06T 3/4069 382/299 |
| 2010/0091185 A1* | 4/2010 | Ueno ................. G09G 3/3611 348/452 |
| 2010/0309315 A1* | 12/2010 | Hogasten ............. H04N 5/332 348/164 |
| 2011/0014982 A1* | 1/2011 | Hiraishi ............... A63F 13/219 463/36 |
| 2011/0164865 A1* | 7/2011 | Hamada ............. H04N 5/23212 396/91 |
| 2012/0026326 A1 | 2/2012 | Itoh et al. |
| 2012/0300115 A1* | 11/2012 | Okada ............. H04N 5/232123 348/348 |
| 2013/0002864 A1 | 1/2013 | Lundberg |
| 2014/0003724 A1* | 1/2014 | Feris ..................... G06T 7/254 382/197 |
| 2014/0253735 A1* | 9/2014 | Fox ..................... H04M 1/0264 348/164 |
| 2015/0163400 A1* | 6/2015 | Geiss ..................... G06T 5/50 348/231.99 |
| 2015/0356371 A1 | 12/2015 | Libal et al. |
| 2016/0152253 A1 | 6/2016 | Katz et al. |
| 2017/0013198 A1* | 1/2017 | Wada ..................... G06T 5/20 |
| 2018/0364451 A1* | 12/2018 | Sumihiro ............. H04N 5/232 |
| 2019/0113710 A1* | 4/2019 | Takinoiri ............... G02B 7/365 |

OTHER PUBLICATIONS

Search Report of Application No. EP 19 76 0367 dated Nov. 3, 2021.

* cited by examiner

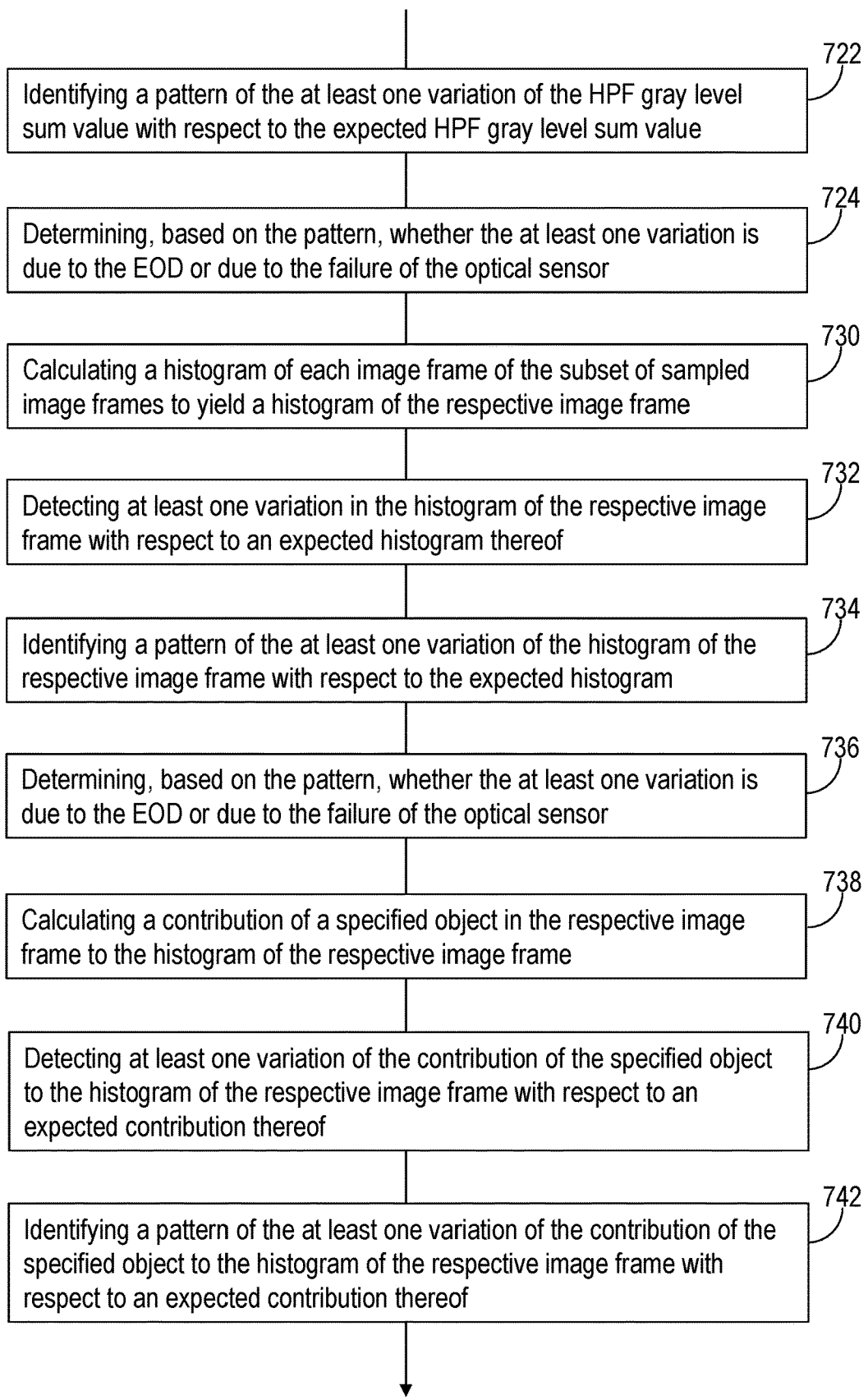
Fig. 7 (cont. 1)

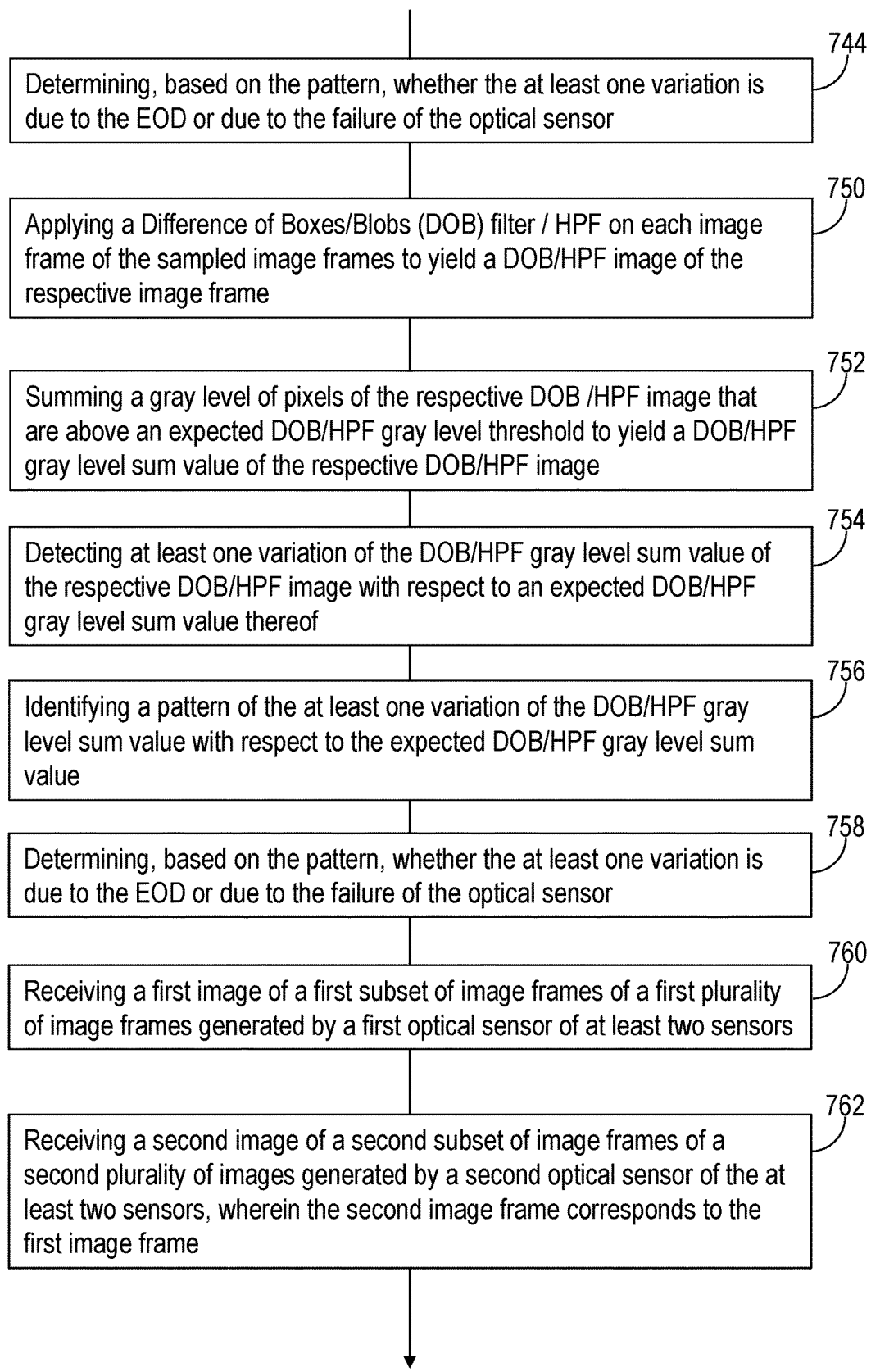
Fig. 7 (cont. 2)

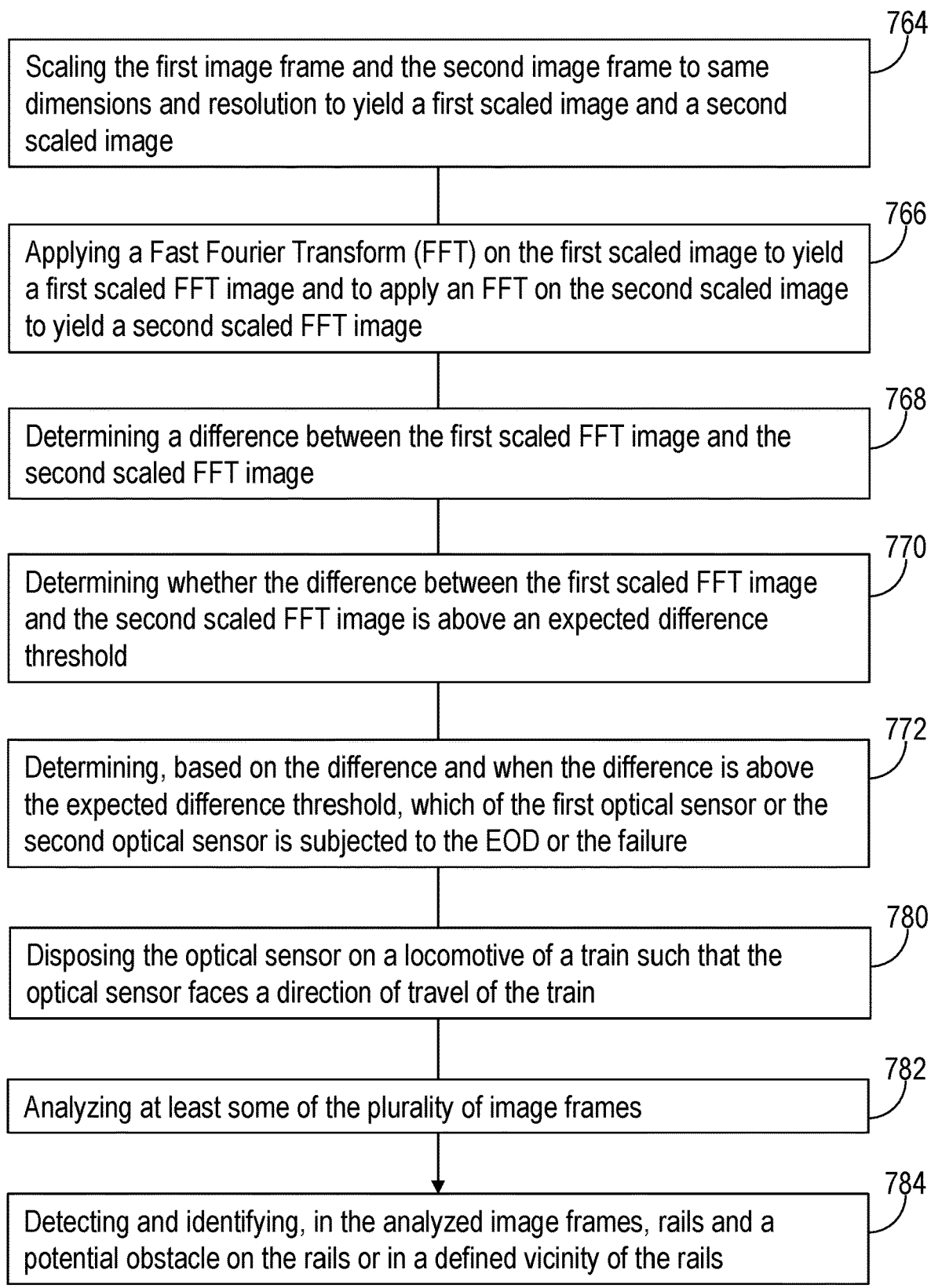
Fig. 7 (cont. 3)

SYSTEM AND METHOD FOR BUILT IN TEST FOR OPTICAL SENSORS

CROSS-REFERENCE TO RELATED APPLICATIONS

This application is a National Phase Application of PCT International Application No. PCT/IL2019/050224, International Filing Date Feb. 27, 2019, entitled System and Method for Built In Test for Optical Sensors, published on Sep. 6, 2019 as WO 2019/167044 claiming the benefit of U.S. Provisional Patent Application No. 62/636,210, filed Feb. 28, 2018, which is hereby incorporated by reference.

FIELD OF THE INVENTION

The present invention relates to the field of optical sensors, and more particularly, to systems and methods for built in test for optical sensors.

BACKGROUND OF THE INVENTION

Optical sensors, such as still or video cameras, when used for providing visual information which is required with a given resolution and/or a given signal-to-noise (S/N) figure may be very sensitive to optical disturbances such as dirt or moisture accumulating on the external optical element (e.g., outmost lens), low visibility due to moist or dusty air, low lighting conditions and the like, collectively nominated 'external optical disturbances' (EOD). There is a need for systems using such optical sensors to be able to verify whether frames acquired using these sensors have low optical quality due to EOD or due to failure (either optical, electronic, physical or another) internal to the system.

SUMMARY OF THE INVENTION

One aspect of the present invention may provide an optical system capable of performing built-in tests of optical sensors thereof, the system may include: an optical sensor configured to generate a plurality of image frames; and a processing unit in communication with the optical sensor, the processing unit may include a built-in test model configured to: detect, in at least one image frame of a subset of image frames of the plurality of images, at least one variation in one or more parameters of the respective at least one image frame as compared to an expected one or more parameters thereof; and determine whether the at least one variation is due to an external optical disturbance (EOD) of the optical sensor or due to a failure of the optical sensor.

In some embodiments, the built-in test module is configured to: apply, on each image frame of the subset of image frames, a Fast Fourier Transform (FFT) to yield an FFT image of the respective image frame; apply a high pass filter (HPF) on the FFT image of the respective image frame to yield a HPF image of the respective image frame; sum values of pixels of the HPF image of the respective HPF image, to yield a HPF gray level sum value of the respective HPF image; determine whether the HPF gray level sum value of the respective HPF image is above an expected HPF sum threshold; and indicate that the optical sensor is subjected to at least one of the EOD or the failure if the HPF gray level sum value of the respective image frame is below the expected HPF sum threshold value.

In some embodiments, the built-in test module is further configured to: detect at least one variation of the HPF gray level sum value of the respective HPF image with respect to an expected HPF gray level sum value thereof; identify a pattern of the at least one variation of the HPF gray level sum value with respect to the expected HPF gray level sum value; and determine, based on the pattern, whether the at least one variation is due to the EOD or due to the failure of the optical sensor.

In some embodiments, the built-in test module is further configured to: calculate a histogram of each image frame of the subset of sampled image frames to yield a histogram of the respective image frame; detect at least one variation in the histogram of the respective image frame with respect to an expected histogram thereof; identify a pattern of the at least one variation of the histogram of the respective image frame with respect to the expected histogram; and determine, based on the pattern, whether the at least one variation is due to the EOD or due to the failure of the optical sensor.

In some embodiments, the built-in test module is further configured to: calculate a contribution of a specified object in the respective image frame to the histogram of the respective image frame; detect at least one variation of the contribution of the specified object to the histogram of the respective image frame with respect to an expected contribution thereof; identify a pattern of the at least one variation of the contribution of the specified object to the histogram of the respective image frame with respect to an expected contribution thereof; and determine, based on the pattern, whether the at least one variation is due to the EOD or due to the failure of the optical sensor.

In some embodiments, the built-in test module is further configured to: apply a High Pass Filter (HPF) on each image frame of the sampled image frames to yield an HPF image of the respective image frame; sum a gray level of pixels of the respective HPF image that are above an expected HPF gray level threshold to yield a HPF gray level sum value of the respective HPF image; detect at least one variation of the HPF gray level sum value of the respective HPF image with respect to an expected HPF gray level sum value thereof; identify a pattern of the at least one variation of the HPF gray level sum value with respect to the expected HPF gray level sum value; and determine, based on the pattern, whether the at least one variation is due to the EOD or due to the failure of the optical sensor.

In some embodiments, the system includes at least two optical sensors, and the processing unit includes a relative built-in test module configured to: receive a first image of a first subset of image frames of a first plurality of image frames generated by a first optical sensor of the at least two sensors; receive a second image a second subset of image frames of a second plurality of images generated by a second optical sensor of the at least two sensors, wherein the second image frame corresponds to the first image frame; scale the first image frame and the second image frame to same dimensions and resolution to yield a first scaled image and a second scaled image; apply a Fast Fourier Transform (FFT) on the first scaled image to yield a first scaled FFT image and to apply and FFT on the second scaled image to yield a second scaled FFT image; determine a difference between the first scaled FFT image and the second scaled FFT image; determine whether the difference between the first scaled FFT image and the second scaled FFT image is above an expected difference threshold; and determine, based on the difference and when the difference is above the expected difference threshold, which of the first optical sensor or the second optical sensor is subjected to the EOD or the failure.

In some embodiments, the system is disposable on a locomotive of a train such that the optical sensor faces direction of travel of the train 90, and the processing unit further includes an obstacle detection module configured to analyze at least some of the plurality of image frames and to detect and identify, in the analyzed image frames, rails and a potential obstacle on the rails or in a defined vicinity of the rails.

Another aspect of the present invention provides a method of performing built-in tests of optical sensors of an optical system, the method may include: receiving a plurality of image frames from an optical sensor; and detecting, in at least one image frame of a subset of image frames of the plurality of images, at least one variation in one or more parameters of the respective at least one image frame as compared to an expected one or more parameters thereof; and determining whether the at least one variation is due to an external optical disturbance (EOD) of the optical sensor or due to a failure of the optical sensor.

In some embodiments, the method further includes: applying, on each image frame of the subset of image frames, a Fast Fourier Transform (FFT) to yield an FFT image of the respective image frame; applying a high pass filter (HPF) on the FFT image of the respective image frame to yield a HPF image of the respective FFT image; summing values of pixels of the HPF image of the respective HPF image, to yield a HPF gray level sum value of the respective HPF image; determining whether the HPF gray level sum value of the respective HPF image is above an expected HPF sum threshold; and indicating that the optical sensor is subjected to at least one of the EOD or the failure if the HPF gray level sum value of the respective image frame is below the expected HPF sum threshold value.

In some embodiments, the method further includes: detecting at least one variation of the HPF gray level sum value of the respective HPF image with respect to an expected HPF gray level sum value thereof; identifying a pattern of the at least one variation of the HPF gray level sum value with respect to the expected HPF gray level sum value; and determining, based on the pattern, whether the at least one variation is due to the EOD or due to the failure of the optical sensor.

In some embodiments, the method further includes: calculating a histogram of each image frame of the subset of sampled image frames to yield a histogram of the respective image frame; detecting at least one variation in the histogram of the respective image frame with respect to an expected histogram thereof; identifying a pattern of the at least one variation of the histogram of the respective image frame with respect to the expected histogram; and determining, based on the pattern, whether the at least one variation is due to the EOD or due to the failure of the optical sensor.

In some embodiments, the method further includes: calculating a contribution of a specified object in the respective image frame to the histogram of the respective image frame; detecting at least one variation of the contribution of the specified object to the histogram of the respective image frame with respect to an expected contribution thereof; identifying a pattern of the at least one variation of the contribution of the specified object to the histogram of the respective image frame with respect to an expected contribution thereof; and determining, based on the pattern, whether the at least one variation is due to the EOD or due to the failure of the optical sensor.

In some embodiments, the method further includes: applying a High Pass Filter on each image frame of the sampled image frames to yield a HPF image of the respective image frame; summing a gray level of pixels of the respective HPF image that are above an expected HPF gray level threshold to yield a HPF gray level sum value of the respective HPF image; detecting at least one variation of the HPF gray level sum value of the respective HPF image with respect to an expected HPF gray level sum value thereof; identifying a pattern of the at least one variation of the HPF gray level sum value with respect to the expected HPF gray level sum value; and determining, based on the pattern, whether the at least one variation is due to the EOD or due to the failure of the optical sensor.

In some embodiments, the method further includes: receiving a first image of a first subset of image frames of a first plurality of image frames generated by a first optical sensor of at least two sensors; receiving a second image a second subset of image frames of a second plurality of images generated by a second optical sensor of the at least two sensors, wherein the second image frame corresponds to the first image frame; scaling the first image frame and the second image frame to same dimensions and resolution to yield a first scaled image and a second scaled image; applying a Fast Fourier Transform (FFT) on the first scaled image to yield a first scaled FFT image and to apply and FFT on the second scaled image to yield a second scaled FFT image; determining a difference between the first scaled FFT image and the second scaled FFT image; determining whether the difference between the first scaled FFT image and the second scaled FFT image is above an expected difference threshold; and determining, based on the difference and when the difference is above the expected difference threshold, which of the first optical sensor or the second optical sensor is subjected to the EOD or the failure.

In some embodiments, the method further includes: deposing the optical sensor on a locomotive of a train such that the optical sensor faces a direction of travel of the train; analyzing at least some of the plurality of image frames; and detecting and identifying, in the analyzed image frames, rails and a potential obstacle on the rails or in a defined vicinity of the rails.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same can be carried into effect, reference will now be made, purely by way of example, to the accompanying drawings in which like numerals designate corresponding elements or sections throughout.

In the accompanying drawings.

Figure 1A:
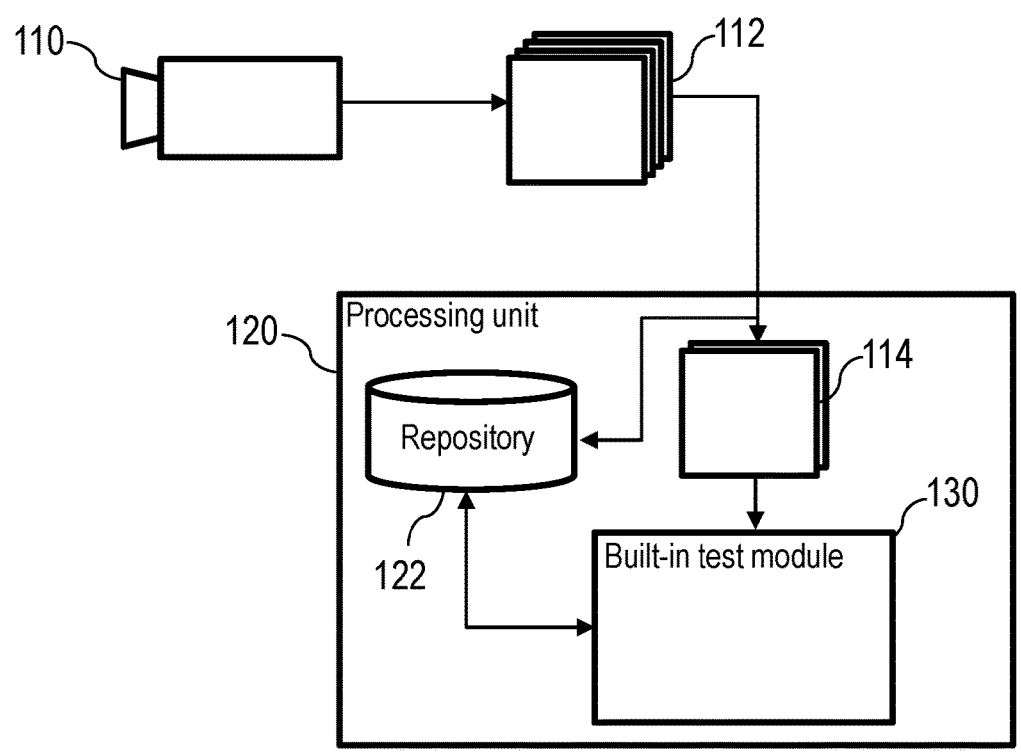
FIG. 1A is a schematic illustration of an optical system capable of performing an optical built-in test of an optical sensor thereof, according to some embodiments of the invention.

It will be appreciated that, for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention are described. For purposes of explanation, specific configurations and details are set forth in order to provide a thorough understanding of the present invention. However, it will also be apparent to one skilled in the art that the present invention can be practiced without the specific details presented herein. Furthermore, well known features can have been omitted or simplified in order not to obscure the present invention. With specific reference to the drawings, it is stressed that the particulars shown are by way of example and for purposes of illustrative discussion of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention can be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments that can be practiced or carried out in various ways as well as to combinations of the disclosed embodiments. Also, it is to be understood that the phraseology and terminology employed herein is for the purpose of description and should not be regarded as limiting.

Unless specifically stated otherwise, as apparent from the following discussions, it is appreciated that throughout the specification discussions utilizing terms such as "processing", "computing", "calculating", "determining", "enhancing" or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. Any of the disclosed modules or units can be at least partially implemented by a computer processor.

Generally, an optical system including one or more optical sensors and a processing unit capable of performing built-in tests of the optical sensor(s) and methods thereof are disclosed.

According to some embodiments, the processing unit includes a built-in test module. The built-in test module may be configured to detect a reduction of an optical quality of at least some of the images generated by the optical sensors with respect to an expected optical quality thereof. In various embodiments, the built-in test module is further configured to determine whether the reduction of the optical quality thereof is due to the "external optical disturbances" (EOD) and/or failure of the optical sensor(s)/system.

According to some embodiments, the processing unit includes a relative built-in test module. The relative built-in test module may be configured to compare at least some images generated by at least two of the optical sensors and to determine the reduction of optical quality of image frames generated by one optical sensor of the at least two optical sensors with respect to another optical sensor of the at least two optical sensors. The reduction of the optical quality may be due to, for example, the EOD and/or failure.

One advantage of the present invention is that implementation of the methods performed by the built-in test module and/or the relative built-in test module may be low consumer of computational resources required to perform the methods. Another advantage of the present invention is that implementation of the methods performed by the built-in test module and/or the relative built-in test module eliminate a need in any predetermined reference data/image frames.

Accordingly, the implementation of the methods thereof may be performed in real time (e.g., without any latency to the stream of the image frames) and virtually without disturbing an operational functionality of the optical system/processing unit, while providing high failure coverage probability. Furthermore, the methods thereof do not require saving/storing of the image frames to perform the methods and thus may reduce the overall storage space of the optical system by about 6 Mb per each image frame that needs not to be saved, compared to methods that require saving of the frames for further processing.

Reference is now made to FIG. 1A, which is a schematic illustration of an optical system 100 capable of performing an optical built-in test of an optical sensor 110 thereof, according to some embodiments of the invention.

According to some embodiments, system 100 includes an optical sensor 110 and a processing unit 120 (e.g., as shown in FIG. 1A). Processing unit 120 may be in communication (wired or wireless) with optical sensor 110. Optical sensor 110 may be, for example, still or video camera.

Optical sensor 110 may be configured to generate a plurality of image frames 112 of the scenes in its field of view (FOV). Processing unit 120 may be configured to receive plurality of image frames 112 from optical sensor 110.

According to some embodiments, processing unit 120 includes a built-in test module 130. Built-in test module 130 may be configured to perform a built-in test of optical sensor 110 based on at least some of the image frames generated by optical sensor 110.

Processing unit 120 may be configured to periodically sample image frames of plurality of image frames 112 according to a desired test frequency and according to a framerate of optical sensor 110 to yield a subset of sampled image frames (SIF) 114 and to input subset of sampled image frames 114 to built-in test module 130.

Built-in test module 130 may be configured to detect a reduction of an optical quality of at least one image frame of subset of sampled image frames 114 as compared to an expected optical quality thereof. The reduction of the optical quality of the image frame(s) may be determined based on a reduction/degradation of high spatial frequency energy of the respective image frame(s) as compared to an expected high spatial frequency energy thereof. The detection of the reduction/degradation of the of high spatial frequency energy of the image frame(s) may be carried out by, for example, applying, on the respective image frame(s), any transformation to a frequency domain (e.g., a Fast Fourier Transform (FFT), as described below with respect to FIG. 1C).

In some embodiments, built-in test module 130 is configured to determine whether the detected reduction of the optical quality of the at least one image frame is due to an external optical disturbance (EOD) of optical sensor 110 or due to a failure (e.g., optical, electronic, physical or the like) of optical sensor 110.

According to various embodiments, built-in test module 130 is configured to detect the reduction of the optical quality of the at least one image frame based on at least one variation in one or more parameters of the respective at least one image frame as compared to an expected one or more parameters thereof. In some embodiments, built-in test module 130 is configured to determine whether the variation(s) thereof is due to the EOD of optical sensor 110 or due to the failure of optical sensor 110 (e.g., as described below with respect to FIG. 1C).

According to some embodiments, processing unit 120 includes a repository 122 of image frames. Processing unit 120 may be configured to store, in repository 122, at least some of plurality of image frames 112 generated by optical sensor 110.

In some embodiments, repository 122 is in communication with built-in module 130. In some embodiments, repository 122 includes a DDR drive.

Figure 1B:
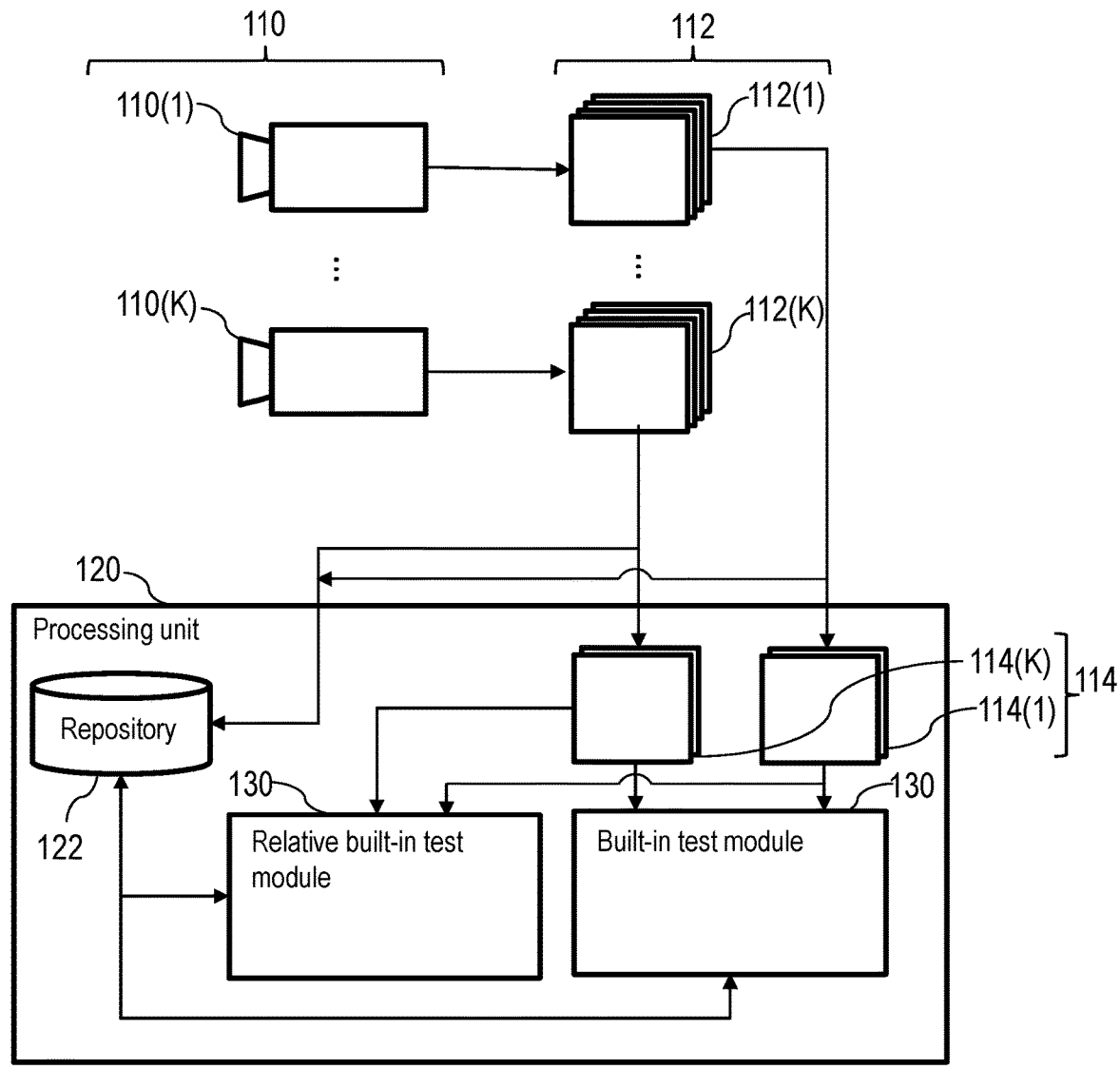
FIG. 1B is a schematic illustration of an optical system including multiple optical sensors and capable of performing a built-in test and a relative built-in test of optical sensors thereof, according to some embodiments of the invention.

Reference is now made to FIG. 1B, which is a schematic illustration of an optical system 100 including multiple optical sensors 110 and capable of performing a built-in test and a relative built-in test of optical sensors 110 thereof, according to some embodiments of the invention.

According to some embodiments, system 100 includes multiple optical sensors 110 (e.g., as shown in FIG. 1B). For example, system 100 may include K optical sensors 110(1) to 110(K) (e.g., as shown in FIG. 1B). Each of multiple optical sensors 110(1) to 110(K) may be configured to generate a respective plurality of image frames, to yield multiple pluralities of image frames 112(1) to 112(K) (e.g., as shown in FIG. 1B).

Processing unit 120 may be configured to sample image frames from pluralities of image frames 112(1) to 112(K) to yield corresponding subsets of sampled image frames 114(1) to 114(K) (e.g., as described above with respect to FIG. 1A).

Figure 1C:
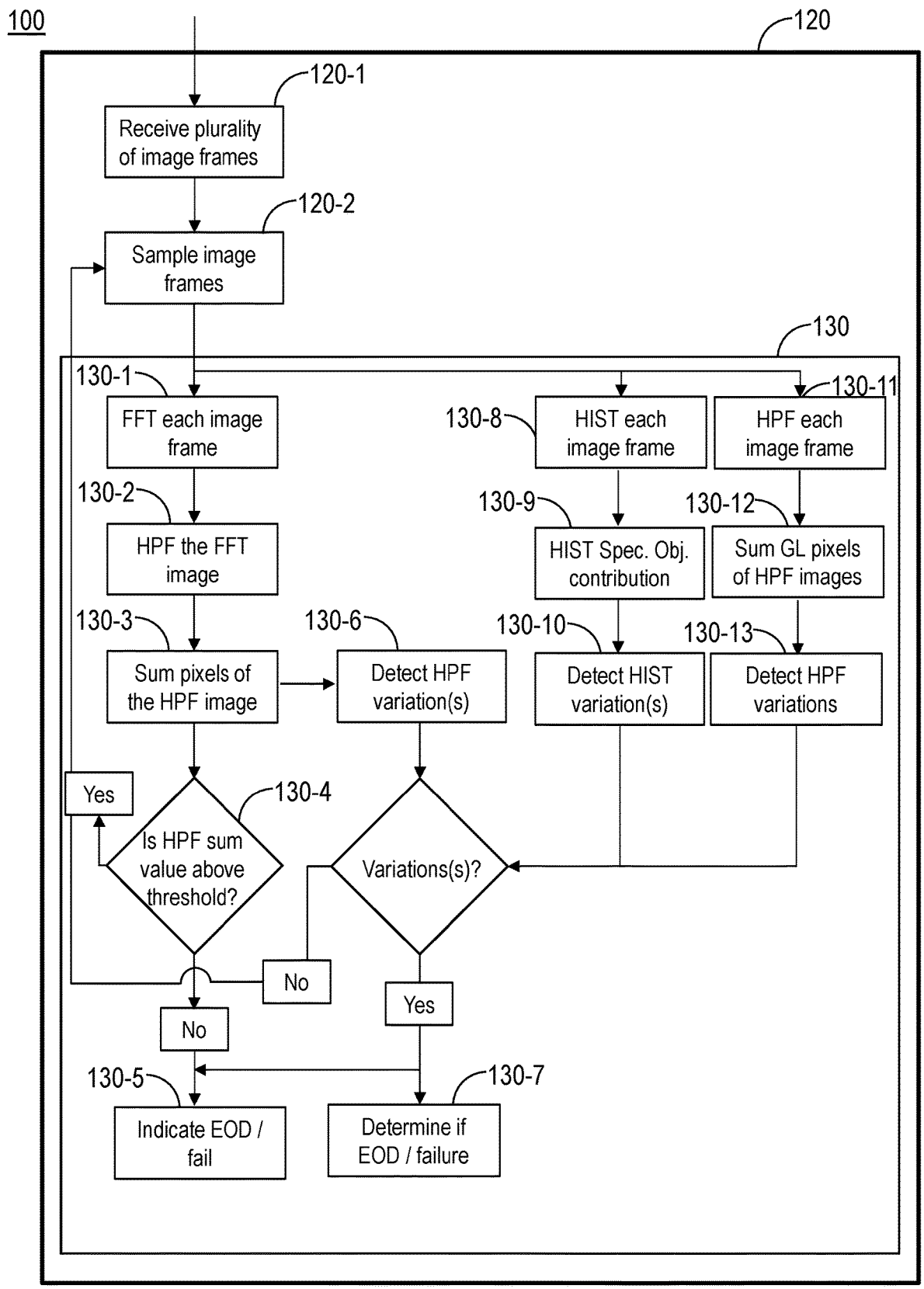
FIG. 1C is a flowchart of a method of performing a built-in test of an optical sensor of an optical system, according to some embodiments of the invention.

Built-in test module 130 of processing unit 120 may be configured to perform the built-in test of at least one optical sensor (or of each optical sensor) of optical sensors 110(1) to 110(K) to thereby detect and/or determine whether the reduction of the optical quality of the image frame(s) generated by the respective optical sensor is due to the EOD and/or due to the failure of the respective optical sensor (e.g., as described above with respect to FIG. 1A and as described below with respect to FIG. 1C).

In various embodiments, built-in test module 130 is configured to perform the build-in test of one optical sensor of optical sensors 110(1) to 110(K) each at a different time or to perform the build-in test of two or more optical sensors of optical sensors 110(1) to 110(K) in parallel. In some embodiments, system 100 includes two or more built-in test modules 130 configured to perform parallel built-in testing of corresponding two or more optical sensors of optical sensors 110(1) to 110(K).

According to some embodiments, system 100 includes a relative built-in test module 140. Relative built-in test module 140 may be configured to compare image frames of at least two subsets of sampled images 114(1) to 114(2) of corresponding at least two of optical sensor(s) 110(1) to 110(K). Relative built-in test module 140 may be configured to detect and indicate, based on the comparison thereof, which of the at least two of optical sensors 110(1) to 110(K), if any, generates image frames with reduced optical quality with respect to each other, due to, for example, the EOD and/or the failure (e.g., as described below with respect to FIG. 1D).

In some embodiments, relative built-in test module may be in communication with repository 122 of image frames.

It is noted that the description below (e.g., made with respect to FIGS. 1C and 1D, FIG. 3, FIG. 4, FIG. 6 and FIG. 7) provides a Fast Fourier Transform (FFT) as an example of transformation of the image frames into a frequency domain. It should be understood that other transformations to the frequency domain may be used as well.

Reference is now made to FIG. 1C, which is a flowchart of a method of performing a built-in test of an optical sensor 110 of an optical system 100, according to some embodiments of the invention.

It is noted that the method is not limited to the flowcharts illustrated in FIG. 1C and to the corresponding description. For example, in various embodiments, the method needs not pass through each illustrated box or stage, or in exactly the same order as illustrated and described.

According to some embodiments, processing unit 120 is configured to receive a plurality of image frames from an optical sensor (stage 120-1). For example, plurality of image frames 112 and optical sensor 110 described above with respect to FIG. 1A.

It is noted that FIG. 1C shows the method of performing the built-in test of a single optical sensor for sake of clarity and that the method thereof may be applied on each of the optical sensors of the optical system.

According to some embodiments, processing unit 120 is configured to periodically sample image frames of the plurality of image frames according to the desired test frequency and according to the framerate of the optical sensor (stage 120-2) to yield a subset of sampled image frames. For example, subset of sampled image frames 114 as described above with respect to FIGS. 1A and 1B.

Build-in test module 130 may be configured to apply the build-in test based on each image frame of the subset of sampled image frames.

According to some embodiments, built-in test module 130 is configured to apply, on each image frame of the subset of sampled image frames, a Fast Fourier Transform (FFT) to yield an FFT image of the respective image frame (stage 130-1). The FFT image may, for example, represent a two-dimensional (2D) spatial frequency domain of the respective image frame.

In some embodiments, built-in test module 130 is configured to apply a high pass filter (HPF) on the FFT image of the respective image frame to yield a HPF image of the respective FFT image (stage 130-2).

In some embodiments, built-in test module 130 is configured to sum energy/gray level of pixels of the respective HPF image, to yield a HPF gray level sum value of the respective HPF image (stage 130-3). In some embodiments, stages 130-3 to 130-6 are performed with respect to the number of pixels of the respective HPF image (e.g., rather than with respect to the HPF gray level sum value thereof).

In some embodiments, built-in test module 130 is configured to determine whether the HPF gray level sum value of the respective HPF image is above an expected HPF gray level sum threshold (stage 130-4).

The HPF gray level sum value may be indicative of, for example, the EOD of the optical sensor or of the failure of the optical sensor. For example, the HPF gray level sum value that is below the expected HPF gray level sum threshold may indicate that the optical sensor may be subjected to the EOD or failure.

In some embodiments, when the HPF gray level sum value of the respective HPF image is below the expected HPF gray level sum threshold value, built-in test module 130 is configured to indicate that the optical sensor is subjected to at least one of the EOD or the failure (stage 130-5).

In other embodiments, when the HPF gray level sum value of the respective HPF image is above the expected HPF gray level sum threshold value, built-in test module 130 is configured to perform the built-in test on a subsequent image frame of the sampled image frames (stage 130-1).

According to some embodiments, built-in test module 130 is configured to detect at least one variation of the HPF gray level sum value of the respective HPF image with respect to an expected/predefined HPF gray level sum value thereof (stage 130-6). It is noted that other parameters of HPF image (e.g., rather than the HPF gray level sum value) may be tracked for detection variation(s) thereof.

Variation(s) of the HPF gray level sum value of the respective HPF with respect to the expected HPF gray level sum value may be indicative of, for example, the EOD and/or of the failure of the optical sensor/system. The variation(s) may, for example, include changes in mean and/or standard deviation of the HPF gray level sum value as compared to expected values thereof.

For example, variation(s) in low frequencies of the HPF image and as a result slow drifting variation(s) (e.g., within a time range of 1-3 sec.) in the mean of HPF gray level sum value with respect to the expected HPF gray level sum value may be indicate of a change in weather conditions (e.g., EOD). In another example, rapid variations (e.g., step function like variations/variation(s) within a time range of $1/30$-$1/25$ sec.) in the HPF gray level sum value as compared to the expected HPF gray level sum value may be indicative of a physical impact/failure of the optical sensor.

In some embodiments, when the variation(s) in the HPF gray level sum value with respect to the expected HPF gray level sum value is/are detected, built-in test module 130 is configured to indicate that the optical sensor is subjected to at least one of the EOD or the failure (stage 130-5).

In some embodiments, built-in-test module 130 is further configured to determine whether the variation(s) is/are due to the EOD or due to the failure of the optical sensor/system (stage 130-7). For example, built-in test module 130 may be configured to identify a pattern of the variation(s) of the HPF gray level sum value with respect to the expected HPF gray level sum value (e.g., either rapid or slow drifting variations, as described above) and to determine, based on the pattern thereof, whether the variation(s) is due to the external optical disturbance or due to the failure of the optical sensor/system.

In other embodiments, when no variation(s) in the HPF gray level sum value with respect to the expected HPF gray level sum value is/are detected, built-in test module 130 is configured to perform the built-in test on a subsequent image frame of the sampled image frames (stage 130-1).

According to some embodiments, built-in test module 130 is configured to calculate a histogram of each image frame of the subset of sampled image frames to yield a histogram (HIST) of the respective image frame (stage 130-8).

In some embodiments, built-in test module 130 is configured to detect a contribution of a specified object in the respective image frame to the histogram of the respective image frame (stage 130-9). For example, in the case when the optical system is a system for detection of obstacles by a moving train, the specified object may be a rail track (e.g., as described below with respect to FIG. 2).

In various embodiments, built-in test module 130 is configured to detect at least one variation in the histogram of the respective image frame with respect to an expected histogram thereof and/or at least one variation in the contribution of the specified object to the histogram of the respective image frame with respect to an expected contribution thereof (stage 130-9). The variation(s) thereof may, for example, include changes in mean and/or standard deviation of the histogram or the contribution to the histogram of the respective image as compared to the expected values thereof.

The variation(s) of the histogram of the respective image with respect to the expected histogram thereof and/or the variation(s) of the contribution of the specified object to the histogram with respect to the expected contribution may be indicative of, for example, the EOD and/or of the failure of the optical sensor/system. For example, rapid variation(s) may be indicative of a physical damage/block (e.g., failure) of the optical sensor. In another example, small drifting variation(s) may be indicative of changing weather conditions (e.g., EOD).

In various embodiments, when variation(s) in the histogram of the respective image frame with respect to the expected histogram and/or the variation(s) of the contribution with respect to the expected contribution to the histogram of the respective image frame are detected, built-in test module 130 is configured to indicate that the optical sensor is subjected to at least one of the EOD or the failure (stage 130-5).

In some embodiments, built-in test module 130 is further configured to determine whether the variation(s) is/are due to the EOD or due to the failure of the optical sensor/system (stage 130-7). For example, built-in test module 130 may be configured to identify a pattern of the variation(s) of the histogram of the respective image frame with respect to the expected histogram or a pattern of the variation(s) of the contribution of the specified object to the histogram of the respective image frame (e.g., either rapid of slow drifting variation(s) as described above) and to determine, based on the pattern(s) thereof, whether the variation(s) is due to the EOD or due to the failure of the optical sensor/system.

In other embodiments, when no variation(s) the histogram of the respective image frame with respect to the expected histogram and/or no variation(s) of the contribution of the specified object to the histogram of the respective image frame are detected, built-in test module 130 is configured to perform the built-in test on a subsequent image frame of the sampled image frames (stage 130-1).

According to some embodiments, built-in test module 130 is configured to apply a Difference of Boxes/Blobs (DOB) filter (or any High Pass Filter (HPF) filter) on each image frame of the sampled image frames to yield a DOB/HPF image of the respective image frame (stage 130-11).

In some embodiments, built-in test module 130 is configured to sum an energy/gray level of pixels of the DOB/HPF image of the respective image frame that are above an expected DOB/HPF threshold to yield a DOB/HPF gray level sum value of the respective DOB/HPF image (stage 130-12). In some embodiments, stages 130-12 to 130-13 are performed with respect to the number of pixels of the respective DOB/HPF image (e.g., rather than with respect to the DOB/HPF gray level sum value thereof).

In some embodiments, built-in test module 130 is configured to detect at least one variation of the DOB/HPF gray level sum value of the respective DOB/HPF image with respect to an expected DOB/HPF gray level sum value thereof (stage 130-13).

Variation(s) of the DOB/HPF gray level sum value of the respective DOB/HPF image with respect to the expected DOB/HPF gray level sum value may be indicative of, for example, the EOD and/or of the failure of the optical sensor/system. The variation(s) may, for example, include changes in mean and/or standard deviation of the DOB/HPF gray level sum value as compared to expected values thereof. For example, rapid variation(s) in the DOB/HPF gray level sum value may be indicate of the failure of the optical sensor. In another example, slow drifting variation(s) may be indicative of the EOD.

In some embodiments, when the variation(s) in the DOB/HPF gray level sum value with respect to the expected DOB/HPF gray level sum value is/are detected, built-in test module 130 is configured to indicate that the optical sensor is subjected to at least one of the EOD or the failure (stage 130-5).

In some embodiments, built-in module 130 is further configured to determine whether the variation(s) is/are due to the EOD or due to the failure of the optical sensor/system (stage 130-7). For example, built-in test module 130 may be configured to identify a pattern of the variation(s) of the DOB/HPF gray level sum value with respect to the expected DOB/HPF gray level sum value (e.g., either rapid or slow drifting variations, as described above) and to determine, based on the pattern thereof, whether the variation(s) is due to the external optical disturbance or due to the failure of the optical sensor/system.

In other embodiments, when no variation(s) in the DOB/HPF gray level sum value with respect to the expected HPF gray level sum value is/are detected, built-in test module 130 is configured to perform the built-in test on a subsequent image frame of the sampled image frames (stage 130-1).

According to some embodiments, built-in test module 130 is configured to perform the build-in test of the optical sensor by utilizing at least one of an FFT channel (e.g., stages 130-1 to 130-6), a HIST channel (e.g., stages 130-8 to 130-10), a DOB/HPF channel (130-11 to 130-13) of the build-in test or any combination thereof on the respective image frame.

According to some embodiments, the expected parameters are determined by built-in test module 130 using machine learning and/or deep learning techniques. For example, built-in test module 130 may be configured to derive and/or to modify the expected parameters from the image frames that are periodically sampled from the plurality of image frames generated by the optical sensor.

The expected parameters may, for example, include the expected HPF sum threshold, the expected HPF gray level sum value, the expected histogram, the expected contribution of the specified object to the histogram, the expected HPF/DOB threshold and/or the expected HPF/DOB gray level sum value—as described above with respect to FIG. 1C.

According to some embodiments, built-in module 130 is configured to detect, in the respective image frame, at least one variation (e.g., vanishing) of at least one object (e.g., buildings, posts, bridges, etc.) that appears in previous image frames and determine, based on the variation(s) thereof that the optical sensor is subjected to the EOD and/or failure.

Figure 1D:
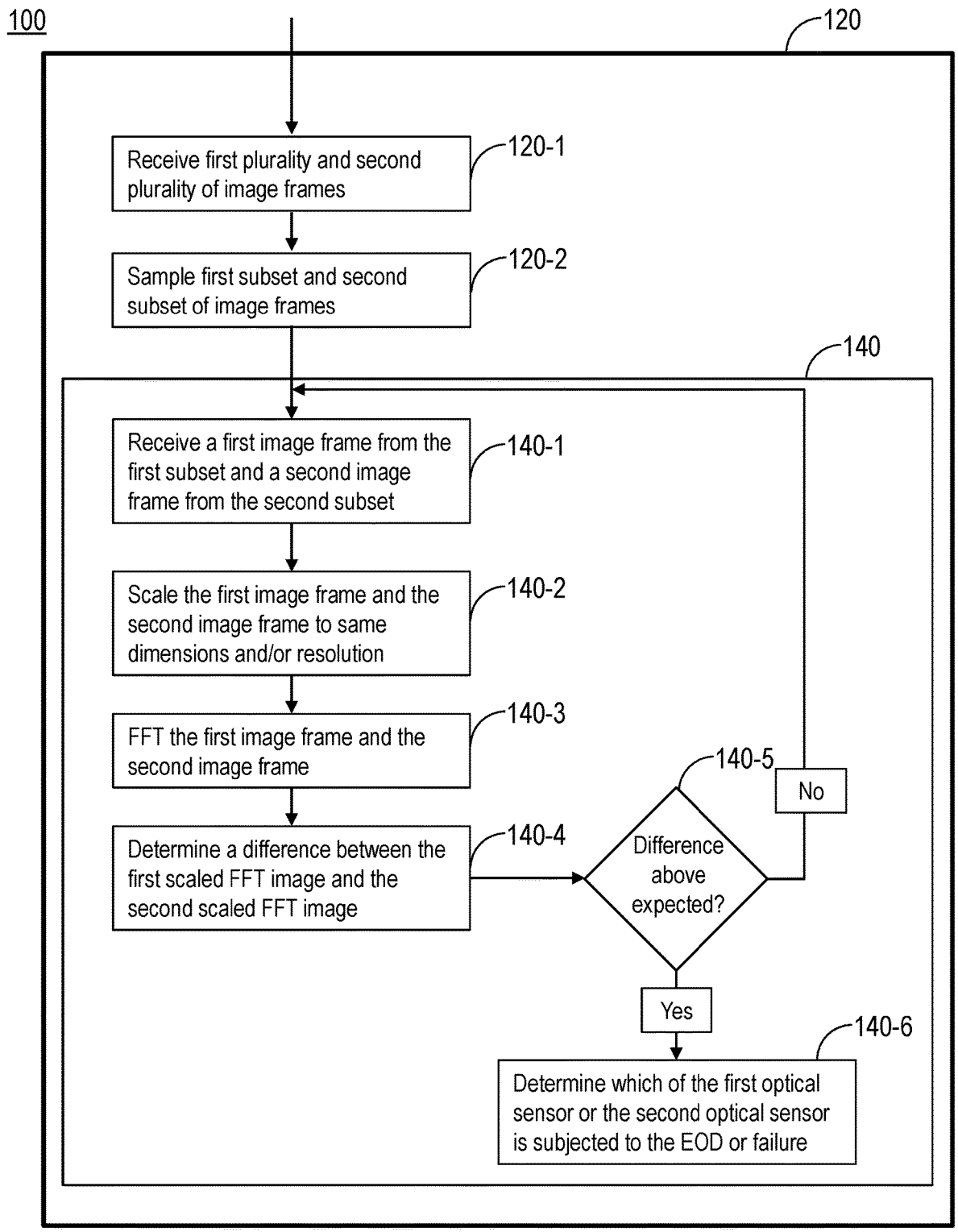
FIG. 1D is a flowchart of a method of performing a relative built-in test of between two optical sensors of an optical system, according to some embodiments of the invention.

Reference is now made to FIG. 1D, which is a flowchart of a method of performing a relative built-in test of between two optical sensors 110 of an optical system 100, according to some embodiments of the invention.

It is noted that the method is not limited to the flowcharts illustrated in FIG. 1C and to the corresponding description. For example, in various embodiments, the method needs not move through each illustrated box or stage, or in exactly the same order as illustrated and described.

According to some embodiments, processing unit 120 is configured to receive a first plurality of image frames from a first optical sensor and a second plurality of image frames from a second optical sensor of the optical sensors of optical system 100 (stage 120-1). For example, the first optical sensor and the second optical sensor may be any of optical sensors 110(1) to 110(K) as described above with respect to FIG. 1B.

According to some embodiments, processing unit 120 is configured to periodically sample the first plurality of image frames to yield a first subset of sampled image frames and to periodically sample the second plurality of the image frames to yield a second subset of sampled image frames (stage 120-2) (e.g., as described above with respect to FIGS. 1A, 1B and 1C).

Relative built-in test module 140 may be confuted to apply the relative built-in test based on each image frame of the first subset of sampled image frames and corresponding image frame of the second subset of sampled image frames.

According to some embodiments, relative built-in rest module 140 is configured to receive a first image frame from the first subset of sampled image frames and a second image frame of the second subset of sampled image frames, wherein the second image frame corresponds to the first image frames (stage 140-1).

In various embodiments, dimensions and/or resolution of the first image frame is different as compared to dimensions and/or resolution of the second image frame. In these embodiments, relative built-in test module 140 is configured to scale the first image frame and the second image frame to same dimensions and/or resolution to yield a first scaled image and a second scaled image (stage 140-2).

In some embodiments, relative built-in test module 140 is configured to apply an FFT on the first scaled image to yield a first scaled FFT image and to apply an FFT on the second scaled image to yield a second scaled FFT image (stage 140-3). In some embodiments, the FFT is applied on each of the first scaled image frame and the second scaled image frames with a gain correction and normalization of the images thereof.

In some embodiments, relative built-in test module 140 is configured to determine a difference between the first scaled FFT image and the second scaled FFT image (state 140-4). The difference thereof may be determined by, for example, subtracting the first scaled FFT image from the second scaled FFT image or by subtracting the second scaled FFT image from the first scaled FFT image.

In some embodiments, relative built-in test module 140 is configured to determine whether the difference between the first scaled FFT image and the second scaled FFT image is above an expected difference threshold (stage 140-5).

In some embodiments, when the difference between the first scaled FFT image and the second scaled FFT image is above the expected difference threshold, relative built-in test module 140 is configured to determine, based on the difference thereof, which of the first optical sensor or the second optical sensor is subjected to the EOD or the failure (stage 140-6).

In other embodiments, when the difference between the first scaled FFT image and the second scaled FFT image is below the expected difference threshold, relative built-in test module 140 is configured to apply the relative built-in test on subsequent image frame of the first set of sampled image frames and corresponding subsequent image frame of the second set of sampled image frames (stage 140-1).

Figure 2:
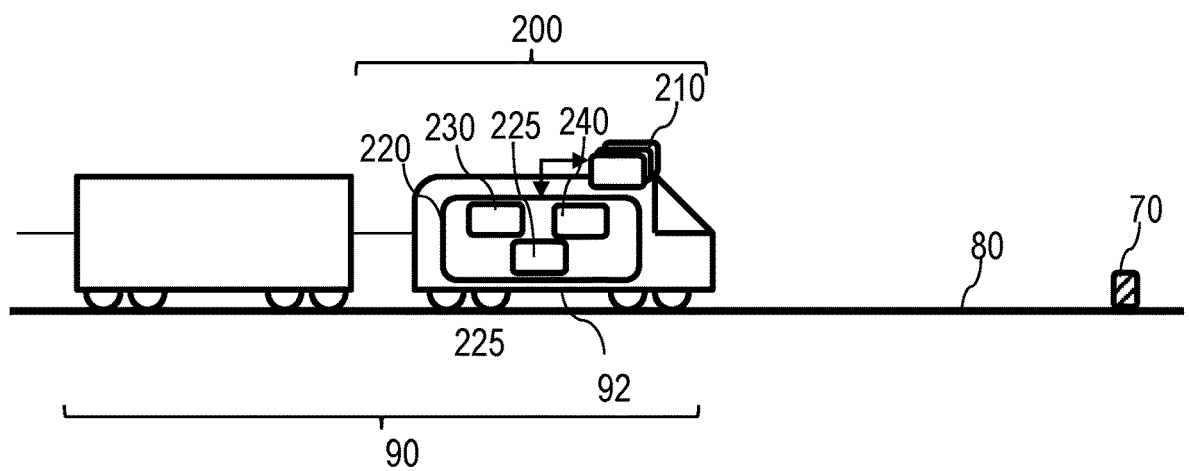
FIG. 2 is a schematic illustration of an optical system for an obstacle detection by a moving train and capable of performing a built-in test and a relative built-in test of optical sensors thereof, according to some embodiments of the invention.

Reference is now made to FIG. 2, which is a schematic illustration of an optical system 200 for an obstacle detection by a moving train 90 and capable of performing a built-in test and a relative built-in test of optical sensors 210 thereof, according to some embodiments of the invention.

According to some embodiments, optical system 200 includes one or more optical sensors 210 and a processing unit 220 in communication with optical sensor(s) 210. System 200 may be disposed on, for example, a locomotive 92 of train 90 such that optical sensor(s) 210 face the direction of travel of train 90. For example, optical system 200, optical sensor(s) 210 and/or processing unit 220 may be similar to optical system 100, optical sensor(s) 110 and/or processing unit 120, respectively, as described above with respect to FIGS. 1A, 1B, 1C and 1D.

Optical sensor(s) 210 may generate images of the environment (e.g., plurality/pluralities of image frames 112 as described above with respect to FIGS. 1A and 1B).

According to some embodiments, processing unit 220 includes an obstacle detection and identification module 225. Obstacle detection and identification module 225 may be configured to analyze the images generated by optical sensor(s) 210 and identify rails 80 in the images and/or identify a potential object/obstacle 70 on rails 80 or in a defined vicinity of rails 80.

According to some embodiments, processing unit 220 includes at least one of: a built-in test module 230 (e.g., similar to built-in test module 130 as described above with respect to FIGS. 1A, 1B and 1C) and a relative built-in test module 240 (e.g., similar to relative built-in test module 140 as described above with respect to FIGS. 1B and 1D).

Built-in test module 230 may be configured to detect the reduction of optical quality of the images generated by at least one of optical sensors 210 and, in some embodiments, to determine whether the reduction of the optical quality thereof is due to the EOD and/or failure (e.g., as described above with respect to FIGS. 1A, 1B and 1C).

Relative built-in test module 240 may be configured to compare images generated by at least two of optical sensor(s) 210 and to detect which of the at least two optical sensors thereof, if any, is subjected to at least one of the EOD and/or failure (e.g., as described above with respect to FIGS. 1B and 1D).

According to some embodiments, the built-in test (e.g., performed by built-in test module 230) and the relative built-in test (e.g., performed by relative built-in test module 240) are performed in parallel.

Figure 3:
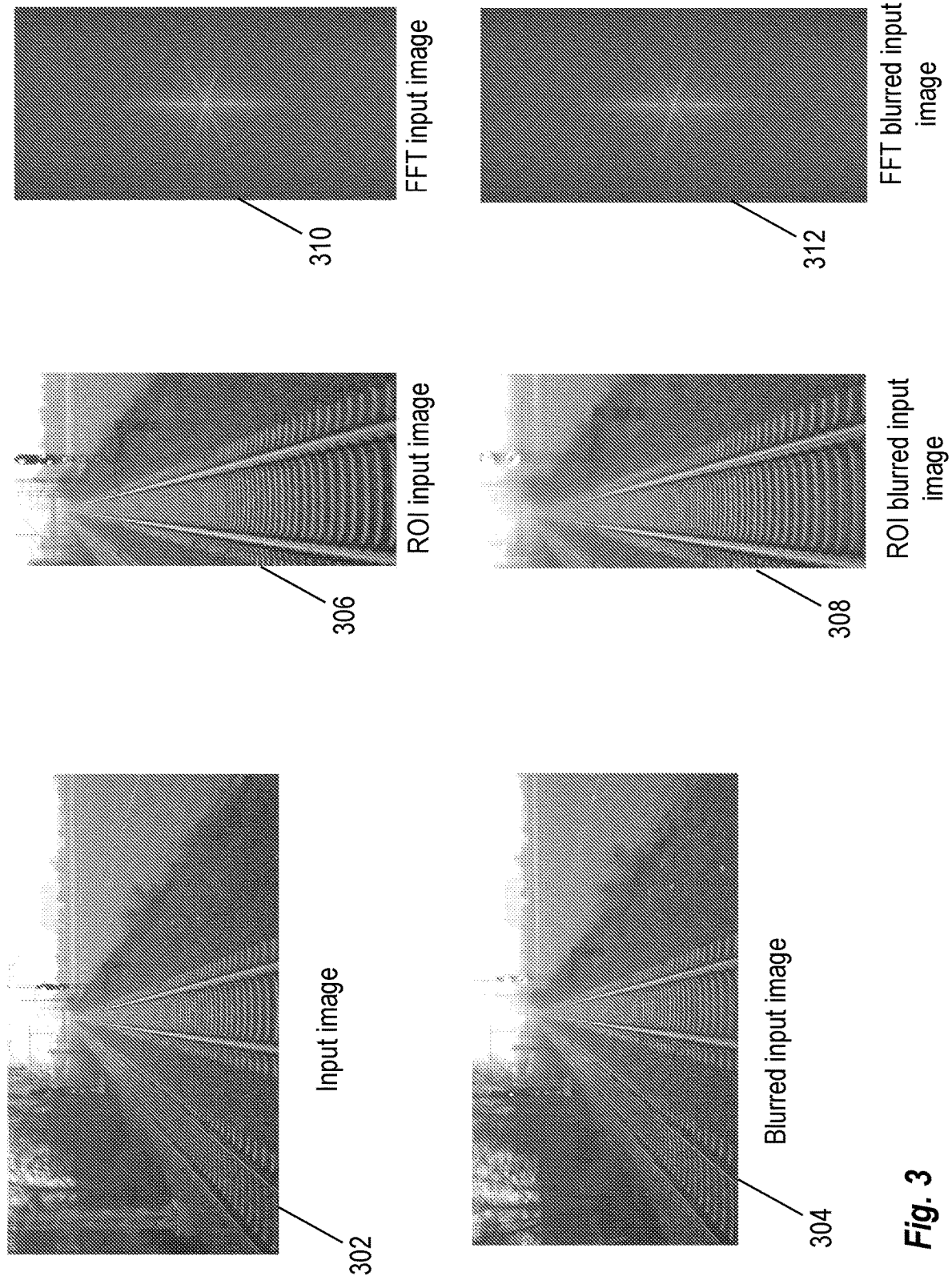
FIG. 3 is a set of image frames taken by an optical system including at least two optical sensors (in which a relative built in test is applied to one subset of the image frames in comparison to a second subset of the image frames, according to embodiments of the invention.

Reference is now made to FIG. 3, which is a set of image frames taken by an optical system (such as optical system 100 or 200) including at least two optical sensors (such as optical sensors 110 or 210) in which a relative built in test is applied to one subset of the image frames in comparison to a second subset of the image frames, according to embodiments of the invention.

Frame 302 is an input image Frame 304 is a blurred image of input image 302. Frame 306 is the ROI image of frame 302. Frame 308 is the blurred image of frame 304. Frame 310 is the result of filtering with FFT filter image 302. Frame 312 is the FFT filtering result of frame 308.

Figure 4:
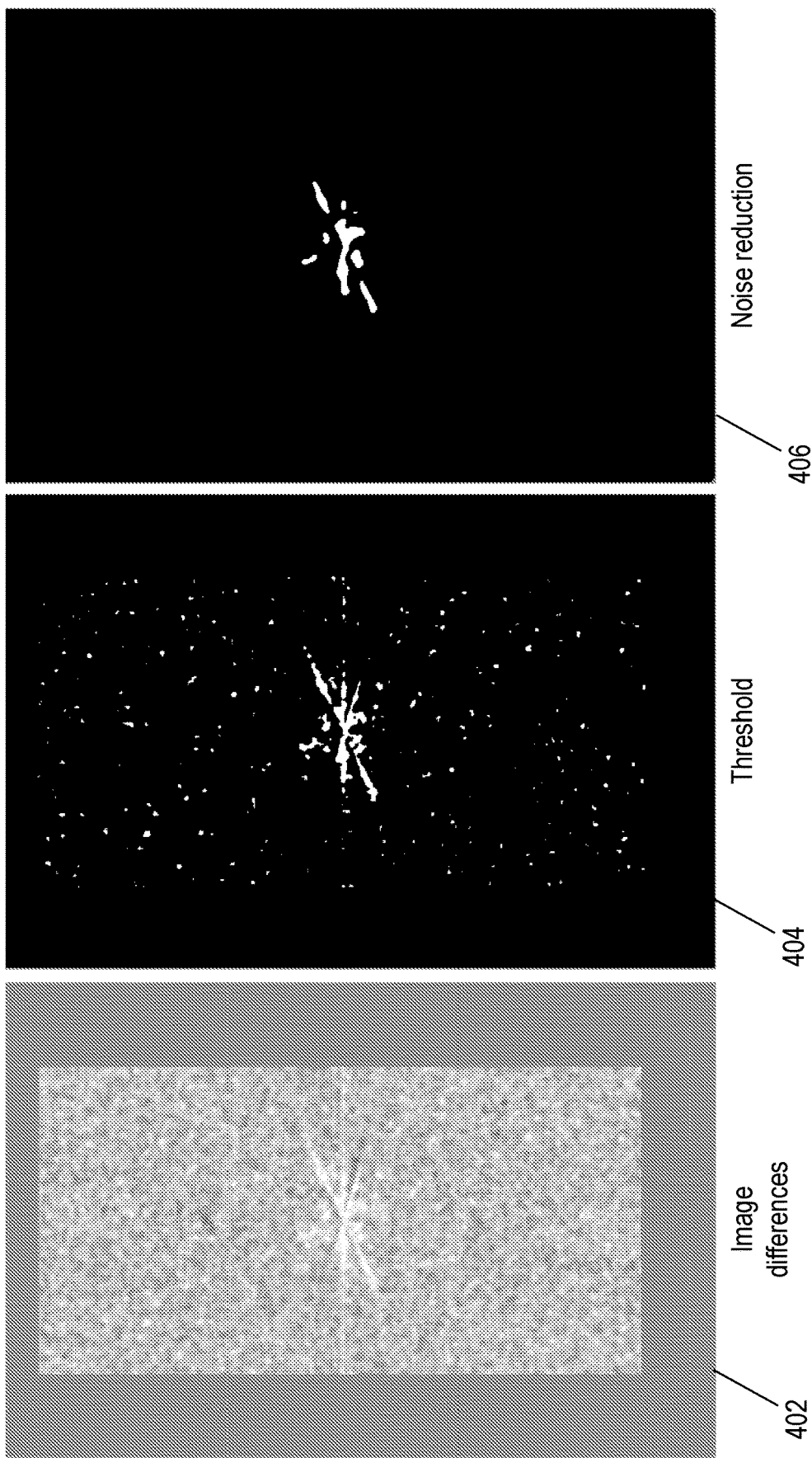
FIG. 4 is a set of image frames presenting an input image frame, the input image frame after applying a threshold filter and after applying a noise filter, according to embodiments of the invention.

Reference is now made to FIG. 4, which is a set of image frames presenting an input image frame, the input image frame after applying a threshold filter and after applying a noise filter, according to embodiments of the invention.

Frame 402 is an input image, frame 404 is the result of activating a threshold on frame 402 and frame 406 is the result of noise reduction operation on frame 406.

Figure 5:
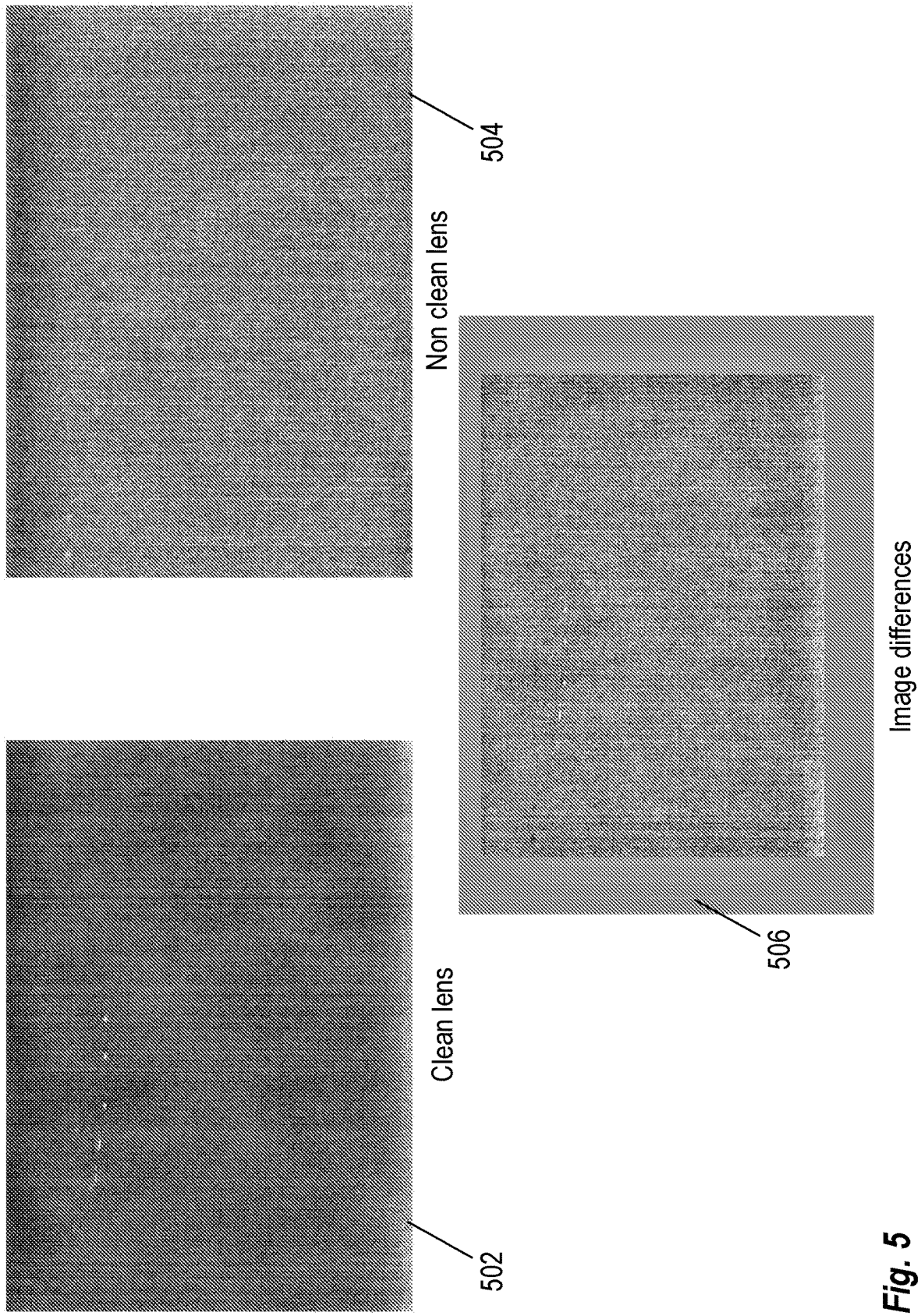
FIG. 5 is a set of frames including an image frame taken with clean lens of an optical sensor of an optical system and an image frame taken with a non-clean lens of the optical sensor of the optical system and a frame resulting from subtraction of the frames images thereof, according to embodiments of the invention.

Reference is now made to FIG. 5, which is a set of frames including a image frame taken with clean lens of an optical sensor of an optical system (such as optical sensors 110, 210 and optical systems 100, 200) and a image frame taken with a non-clean lens of the optical sensor of the optical system and a frame resulting from subtraction of the frames images thereof, according to embodiments of the invention.

Image frame 502 depicts an image taken with clean lens of the optical sensor. Image frame 504 depicts the image of the same scenery taken with non-clean lens of the optical sensor and frame 506 depicts the image resulting from applying difference operator on the image frames 502 and 504.

Figure 6:
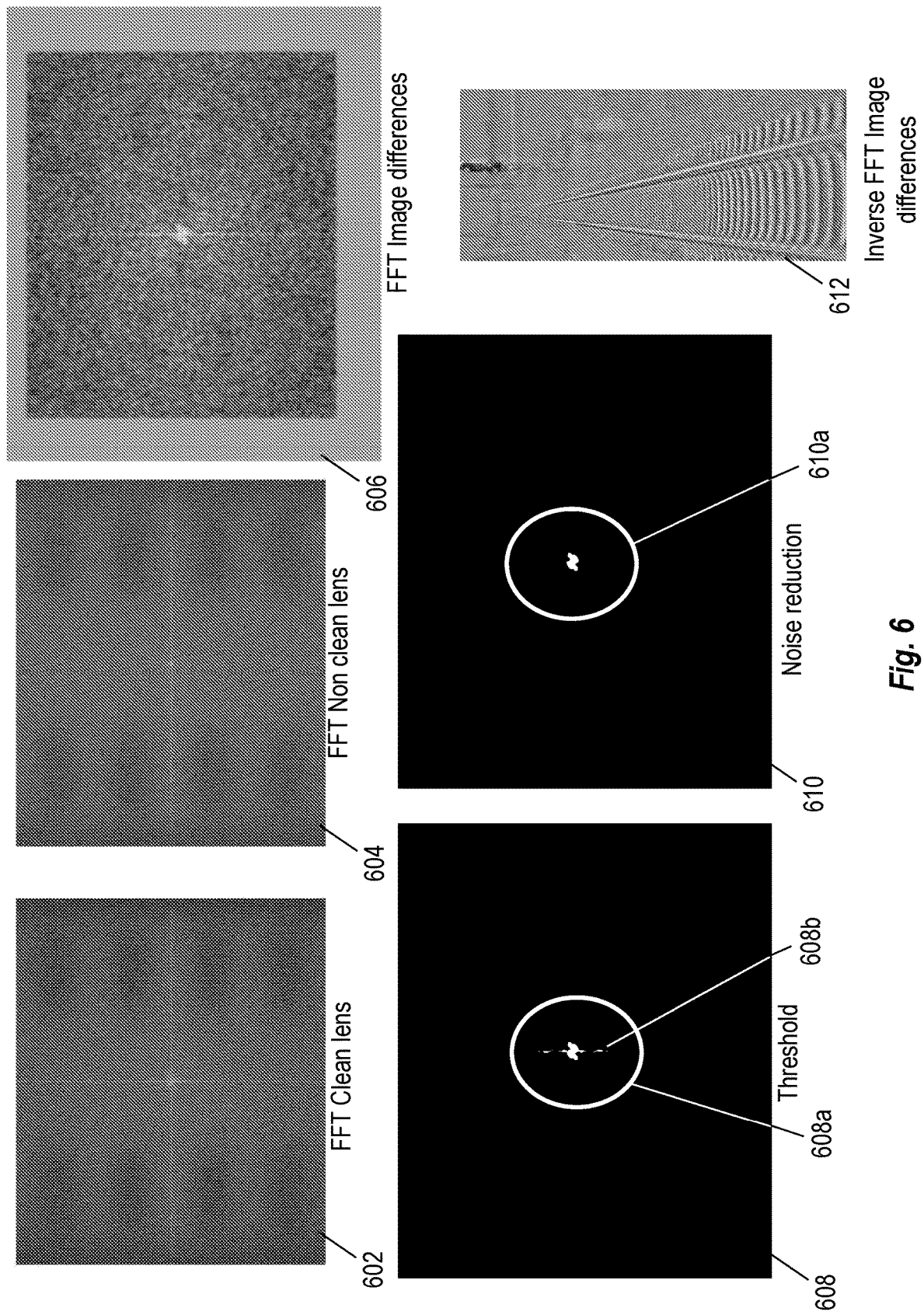
FIG. 6 is a set of image frames showing images taken by an optical sensor of an optical system on which a FFT operator was effected, and derivatives of these frames on which subtraction, threshold and noise reduction have been operated, according to embodiments of the invention.

Reference is now made to FIG. 6, which is a set of image frames showing image frames taken by an optical sensor of an optical system (such as optical sensors 110, 210 and optical systems 100, 200) on which a FFT operator was effected, and derivatives of these frames on which subtraction, threshold and noise reduction have been operated, according to embodiments of the invention.

Image frame 606 depicts the result of operating difference operator on input image frame subject to FFT taken by the optical sensor of the optical sensor with clean lens (image frame 602) and an FFT result of an image frame taken by the optical sensor with non-clean lens (image frame 604). Image frame 608 depicts the result of applying a threshold on the image of frame 606 (the resulting artifact 608b shown encircled with circle 608a. Image frame 610 depicts the result of applying noise reduction on the image of frame 608. Image frame 612 depicts the result of applying inverse FFT and noise reduction and differences on the input shown in FIG. 4.

Figure 7:
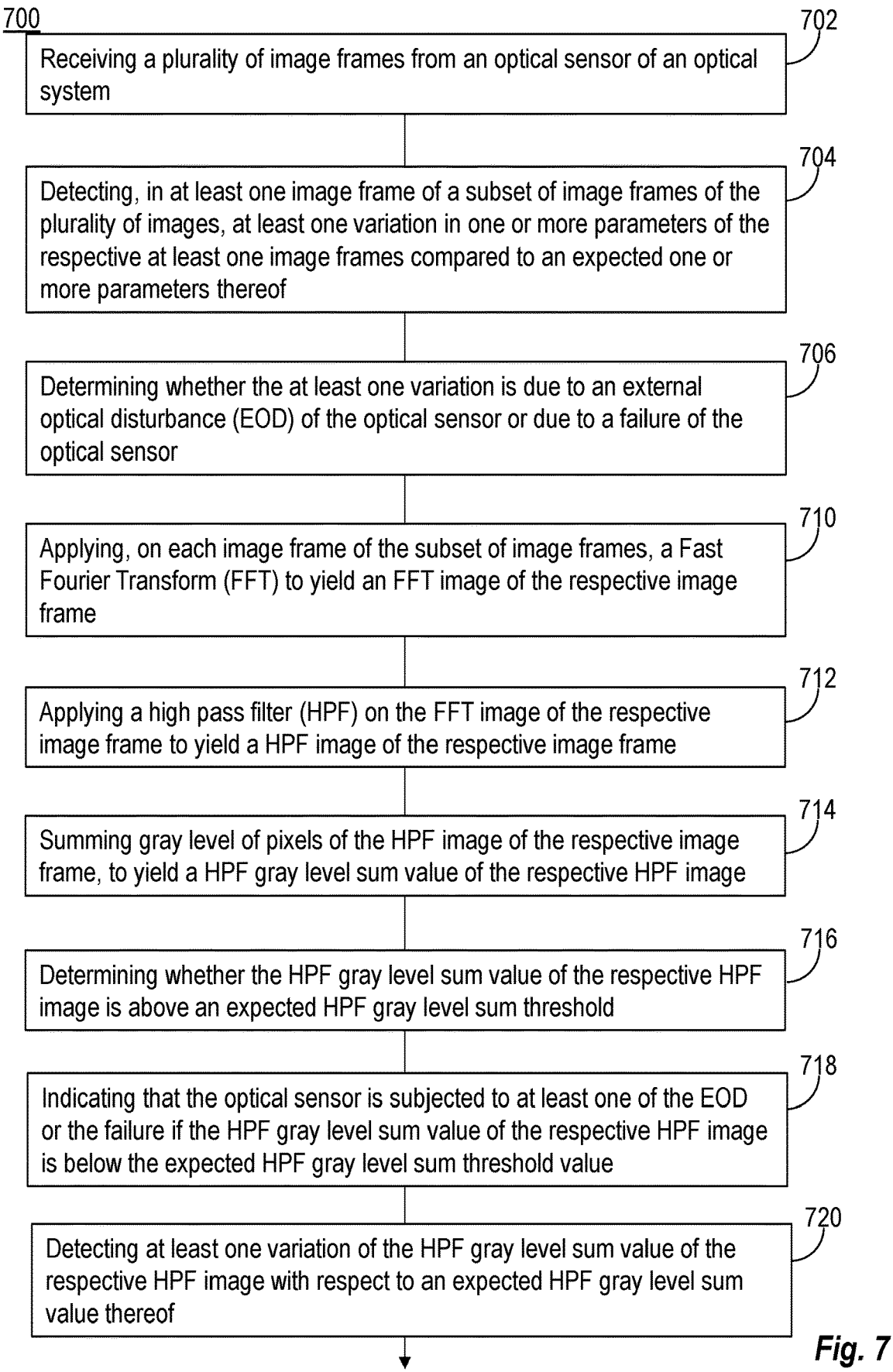
FIG. 7 is a flowchart of a method of performing built-in tests of optical sensors of an optical system, according to some embodiments of the invention.

Reference is now made to FIG. 7, which is a flowchart of a method 700 of performing built-in tests of optical sensors of an optical system, according to some embodiments of the invention.

Method 700 may be implemented by optical system 100 (e.g., as described above with respect to FIGS. 1A, 1B, 1C and 1D) or optical system 200 (e.g., as described above with respect to FIG. 2), which may be configured to implement method 700. It is noted that method 700 is not limited to the flowcharts illustrated in FIG. 7 and to the corresponding description. For example, in various embodiments, method 700 needs not move through each illustrated box or stage, or in exactly the same order as illustrated and described.

According to some embodiments, method 700 includes receiving a plurality of image frames from an optical sensor of an optical system (stage 702). For example, the optical sensor may be any one of optical sensors 110 or 210 and the optical system may be any one of optical systems 100 or 200 (as described above with respect to FIGS. 1A-1D and FIG. 2, respectively)

In some embodiments, method 700 includes detecting, in at least one image frame of a subset of image frames of the plurality of images, at least one variation in one or more parameters of the respective at least one image frame as compared to an expected one or more parameters thereof (stage 704). For example, the subset of image frames may be subset 114 of sampled images (e.g., as described above with react to FIGS. 1A and 1C).

In some embodiments, method 700 includes determining whether the at least one variation is due to an external optical disturbance (EOD) of the optical sensor or due to a failure of the optical sensor (stage 706) (e.g., as described above with respect to FIG. 1A).

According to some embodiments, method 700 includes applying, on each image frame of the subset of image frames, a Fast Fourier Transform (FFT) to yield an FFT image of the respective image frame (stage 710) (e.g., as described above with respect to FIG. 1C). It is noted that other transformations to a frequency domain (rather than FFT) may be applied on the image frames (e.g., as described above with respect to FIG. 1C).

In some embodiments, method 700 includes applying a high pass filter (HPF) on the FFT image of the respective image frame to yield a HPF image of the respective FFT image (stage 712) (e.g., as described above with respect to FIG. 1C).

In some embodiments, method 700 includes summing energy/gray level of pixels of the HPF image of the respective HPF image, to yield an HPF gray level sum value of the respective HPF image (stage 714) (e.g., as described above with respect to FIG. 1C).

In some embodiments, method 700 includes determining whether the HPF gray level sum value of the respective HPF image is above an expected HPF gray level sum threshold (stage 716) (e.g., as described above with respect to FIG. 1C).

In some embodiments, method 700 includes indicating that the optical sensor is subjected to at least one of the EOD or the failure if the HPF gray level sum value of the respective HPF image is below the expected HPF gray level sum threshold value (stage 718) (e.g., as described above with respect to FIG. 1C).

In some embodiments, method 700 includes detecting at least one variation of the HPF gray level sum value of the respective HPF image with respect to an expected HPF gray level sum value thereof (stage 720) (e.g., as described above with respect to FIG. 1C).

In some embodiments, method 700 includes identifying a pattern of the at least one variation of the HPF gray level sum value with respect to the expected HPF gray level sum value (stage 722) (e.g., as described above with respect to FIG. 1C).

In some embodiments, method 700 includes determining, based on the pattern, whether the at least one variation is due to the EOD or due to the failure of the optical sensor (stage 724) (e.g., as described above with respect to FIG. 1C).

According to some embodiments, method 700 includes calculating a histogram of each image frame of the subset of sampled image frames to yield a histogram of the respective image frame (stage 730) (e.g., as described above with respect to FIG. 1C).

In some embodiments, method 700 includes detecting at least one variation in the histogram of the respective image frame with respect to an expected histogram thereof (stage 732) (e.g., as described above with respect to FIG. 1C).

In some embodiments, method 700 includes identifying a pattern of the at least one variation of the histogram of the respective image frame with respect to the expected histogram (stage 734) (e.g., as described above with respect to FIG. 1C).

In some embodiments, method 700 includes determining, based on the pattern, whether the at least one variation is due to the EOD or due to the failure of the optical sensor (stage 736) (e.g., as described above with respect to FIG. 1C).

In some embodiments, method 700 includes calculating a contribution of a specified object in the respective image frame to the histogram of the respective image frame (stage 738) (e.g., as described above with respect to FIG. 1C).

In some embodiments, method 700 includes detecting at least one variation of the contribution of the specified object to the histogram of the respective image frame with respect to an expected contribution thereof (stage 740) (e.g., as described above with respect to FIG. 1C).

In some embodiments, method 700 includes identifying a pattern of the at least one variation of the contribution of the specified object to the histogram of the respective image frame with respect to an expected contribution thereof (stage 742) (e.g., as described above with respect to FIG. 1C).

In some embodiments, method 700 includes determining, based on the pattern, whether the at least one variation is due to the EOD or due to the failure of the optical sensor (stage 744) (e.g., as described above with respect to FIG. 1C).

According to some embodiments, method 700 includes applying a Difference of Boxes/Blobs (DOB) filter, or any other High Pass Filter (HPF), on each image frame of the sampled image frames to yield a DOB/HPF image of the respective image frame (stage 750) (e.g., as described above with respect to FIG. 1C).

In some embodiments, method 700 includes summing an energy/gray level of pixels of the DOB/HPF image of the respective DOB/HPF image that are above an expected DOB/HPF threshold to yield a DOB/HPF gray level sum value of the respective DOB/HPF image (stage 752) (e.g., as described above with respect to FIG. 1C).

In some embodiments, method 700 includes detecting at least one variation of the DOB/HPF gray level sum value of the respective image frame with respect to an expected DOB/HPF gray level sum value thereof (stage 754) (e.g., as described above with respect to FIG. 1C).

In some embodiments, method 700 includes identifying a pattern of the at least one variation of the DOB/HPF gray level sum value with respect to the expected DOB/HPF gray level sum value (stage 756) (e.g., as described above with respect to FIG. 1D).

In some embodiments, method 700 includes determining, based on the pattern, whether the at least one variation is due to the EOD or due to the failure of the optical sensor (stage 758) (e.g., as described above with respect to FIG. 1C).

According to some embodiments, method 700 includes receiving a first image of a first subset of image frames of a first plurality of image frames generated by a first optical sensor of at least two sensors (stage 760) (e.g., as described above with respect to FIG. 1D).

In some embodiments, method 700 includes receiving a second image a second subset of image frames of a second plurality of images generated by a second optical sensor of the at least two sensors, wherein the second image frame corresponds to the first image frame (stage 762) (e.g., as described above with respect to FIG. 1D).

In some embodiments, method 700 includes scaling the first image frame and the second image frame to same dimensions and resolution to yield a first scaled image and a second scaled image (stage 764) (e.g., as described above with respect to FIG. 1D).

In some embodiments, method 700 includes applying a Fast Fourier Transform (FFT) on the first scaled image to yield a first scaled FFT image and to apply and FFT on the second scaled image to yield a second scaled FFT image (stage 766) (e.g., as described above with respect to FIG. 1D).

In some embodiments, method 700 includes determining a difference between the first scaled FFT image and the second scaled FFT image (stage 768) (e.g., as described above with respect to FIG. 1D).

In some embodiments, method 700 includes determining whether the difference between the first scaled FFT image and the second scaled FFT image is above an expected difference threshold (stage 770) (e.g., as described above with respect to FIG. 1D).

In some embodiments, method 700 includes determining, based on the difference and when the difference is above the expected difference threshold, which of the first optical sensor or the second optical sensor is subjected to the EOD or the failure (stage 772) (e.g., as described above with respect to FIG. 1D).

According to some embodiments, method 700 includes deposing the optical sensor on a locomotive of a train such that the optical sensor faces a direction of travel of the train (stage 780) (e.g., as described above with respect to FIG. 2).

In some embodiments, method 700 includes analyzing at least some of the plurality of image frames (stage 782) (e.g., as described above with respect to FIG. 2).

In some embodiments, method 700 includes detecting and identifying, in the analyzed image frames, rails and a potential obstacle on the rails or in a defined vicinity of the rails (stage 784) (e.g., as described above with respect to FIG. 2).

One advantage of the present invention is that implementation of the methods performed by the built-in test module and/or the relative built-in test module may be low consumer of computational resources required to perform the methods. Another advantage of the present invention is that implementation of the methods performed by the built-in test module and/or the relative built-in test module eliminate a need in any predetermined reference data/image frames.

Accordingly, the implementation of the methods thereof may be performed in real time (e.g., without any latency to the stream of the image frames) and virtually without disturbing an operational functionality of the optical system/processing unit, while providing high failure coverage probability. Furthermore, the methods thereof do not require saving/storing of the image frames to perform the methods (e.g., as described above with respect to FIGS. 1C, 1D and FIG. 7) and thus may reduce the overall storage space of the optical system by about 6 Mb per each image frame that needs not to be saved.

Aspects of the present invention are described above with reference to flowchart illustrations and/or portion diagrams of methods, apparatus (systems) and computer program products according to embodiments of the invention. It will be understood that each portion of the flowchart illustrations and/or portion diagrams, and combinations of portions in the flowchart illustrations and/or portion diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or portion diagram or portions thereof.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or portion diagram portion or portions thereof. The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or portion diagram portion or portions thereof.

The aforementioned flowchart and diagrams illustrate the architecture, functionality, and operation of possible implementations of systems, methods and computer program products according to various embodiments of the present invention. In this regard, each portion in the flowchart or portion diagrams can represent a module, segment, or portion of code, which includes one or more executable instructions for implementing the specified logical function(s). It should also be noted that, in some alternative implementations, the functions noted in the portion can occur out of the order noted in the figures. For example, two portions shown in succession can, in fact, be executed substantially concurrently, or the portions can sometimes be executed in the reverse order, depending upon the functionality involved. It will also be noted that each portion of the portion diagrams and/or flowchart illustration, and combinations of portions in the portion diagrams and/or flowchart illustration, can be implemented by special purpose hardware-based systems that perform the specified functions or acts, or combinations of special purpose hardware and computer instructions.

In the above description, an embodiment is an example or implementation of the invention. The various appearances of "one embodiment", "an embodiment", "certain embodiments" or "some embodiments" do not necessarily all refer to the same embodiments. Although various features of the invention can be described in the context of a single embodiment, the features can also be provided separately or in any suitable combination. Conversely, although the invention can be described herein in the context of separate embodiments for clarity, the invention can also be implemented in a single embodiment. Certain embodiments of the invention can include features from different embodiments disclosed above, and certain embodiments can incorporate elements from other embodiments disclosed above. The disclosure of elements of the invention in the context of a specific embodiment is not to be taken as limiting their use in the specific embodiment alone. Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described. Meanings of technical and scientific terms used herein are to be commonly understood as by one of ordinary skill in the art to which the invention belongs, unless otherwise defined. While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. An optical system capable of performing built-in tests of optical sensors thereof, the system comprising:
   an optical sensor configured to generate a plurality of image frames; and
   a processing unit in communication with the optical sensor, wherein the processing unit comprises:
      a built-in test model configured to:
         detect, in at least one image frame of a subset of image frames of the plurality of images, at least one variation in one or more parameters of the respective at least one image frame as compared to an expected one or more parameters thereof; and
         determine whether the at least one variation is due to an external optical disturbance (EOD) of the optical sensor or due to a failure of the optical sensor;
         apply, on each image frame of the subset of image frames, a Fast Fourier Transform (FFT) to yield an FFT image of the respective image frame;
         apply a high pass filter (HPF) on the FFT image of the respective image frame to yield a HPF image of the respective image frame;
         sum gray level of pixels of the HPF image of the respective HPF image, to yield a HPF gray level sum value of the respective HPF image;
         determine whether the HPF gray level sum value of the respective HPF image is above an expected HPF gray level sum threshold; and
         indicate that the optical sensor is subjected to at least one of the EOD or the failure if the HPF gray level sum value of the respective image frame is below the expected HPF gray level sum threshold value.

2. The system of claim 1, wherein the built-in test module is further configured to:
   detect at least one variation of the HPF gray level sum value of the respective HPF image with respect to an expected HPF gray level sum value thereof;
   identify a pattern of the at least one variation of the HPF gray level sum value with respect to the expected HPF gray level sum value; and
   determine, based on the pattern, whether the at least one variation is due to the EOD or due to the failure of the optical sensor.

3. The system of claim 1 disposable on a locomotive of a train such that the optical sensor faces direction of travel of a train, wherein the processing unit further comprises an obstacle detection module configured to analyze at least some of the plurality of image frames and to detect and identify, in the analyzed image frames, rails and a potential obstacle on the rails or in a defined vicinity of the rails.

4. An optical system capable of performing built-in tests of optical sensors thereof, the system comprising:
   an optical sensor configured to generate a plurality of image frames; and
   a processing unit in communication with the optical sensor, the processing unit comprising:
      a built-in test model configured to:
         detect, in at least one image frame of a subset of image frames of the plurality of images, at least one variation in one or more parameters of the respective at least one image frame as compared to an expected one or more parameters thereof; and
         determine whether the at least one variation is due to an external optical disturbance (EOD) of the optical sensor or due to a failure of the optical sensor;
         calculate a histogram of each image frame of the subset of sampled image frames to yield a histogram of the respective image frame;
         detect at least one variation in the histogram of the respective image frame with respect to an expected histogram thereof;
         identify a pattern of the at least one variation of the histogram of the respective image frame with respect to the expected histogram; and
         determine, based on the pattern, whether the at least one variation is due to the EOD or due to the failure of the optical sensor.

5. The system of claim 4, wherein the built-in test module is further configured to:
   calculate a contribution of a specified object in the respective image frame to the histogram of the respective image frame;
   detect at least one variation of the contribution of the specified object to the histogram of the respective image frame with respect to an expected contribution thereof;
   identify a pattern of the at least one variation of the contribution of the specified object to the histogram of the respective image frame with respect to an expected contribution thereof; and
   determine, based on the pattern, whether the at least one variation is due to the EOD or due to the failure of the optical sensor.

6. An optical system capable of performing built-in tests of optical sensors thereof, the system comprising:
   an optical sensor configured to generate a plurality of image frames; and
   a processing unit in communication with the optical sensor, the processing unit comprising:
      a built-in test model configured to:
         detect, in at least one image frame of a subset of image frames of the plurality of images, at least one variation in one or more parameters of the respective at least one image frame as compared to an expected one or more parameters thereof; and determine whether the at least one variation is due to an external optical disturbance (EOD) of the optical sensor or due to a failure of the optical sensor;

apply a High Pass Filter (HPF) on each image frame of the sampled image frames to yield an HPF image of the respective image frame;

sum a gray level of pixels of the respective HPF image that are above an expected HPF gray level threshold to yield a HPF gray level sum value of the respective HPF image;

detect at least one variation of the HPF gray level sum value of the respective HPF image with respect to an expected HPF gray level sum value thereof;

identify a pattern of the at least one variation of the HPF gray level sum value with respect to the expected HPF gray level sum value; and determine, based on the pattern, whether the at least one variation is due to the EOD or due to the failure of the optical sensor.

7. An optical system capable of performing built-in tests of optical sensors thereof, the system comprising:

an optical sensor configured to generate a plurality of image frames;

a processing unit in communication with the optical sensor, the processing unit comprising:

a built-in test model configured to:

detect, in at least one image frame of a subset of image frames of the plurality of images, at least one variation in one or more parameters of the respective at least one image frame as compared to an expected one or more parameters thereof; and determine whether the at least one variation is due to an external optical disturbance (EOD) of the optical sensor or due to a failure of the optical sensor; and at least two optical sensors, wherein the processing unit comprises a relative built-in test module configured to:

receive a first image of a first subset of image frames of a first plurality of image frames generated by a first optical sensor of the at least two sensors;

receive a second image a second subset of image frames of a second plurality of images generated by a second optical sensor of the at least two sensors, wherein the second image frame corresponds to the first image frame;

scale the first image frame and the second image frame to same dimensions and resolution to yield a first scaled image and a second scaled image;

apply a Fast Fourier Transform (FFT) on the first scaled image to yield a first scaled FFT image and to apply and FFT on the second scaled image to yield a second scaled FFT image;

determine a difference between the first scaled FFT image and the second scaled FFT image;

determine whether the difference between the first scaled FFT image and the second scaled FFT image is above an expected difference threshold; and determine, based on the difference and when the difference is above the expected difference threshold, which of the first optical sensor or the second optical sensor is subjected to the EOD or the failure.

8. A method of performing built-in tests of optical sensors of an optical system, the method comprising:

receiving a plurality of image frames from an optical sensor;

detecting, in at least one image frame of a subset of image frames of the plurality of images, at least one variation in one or more parameters of the respective at least one image frame as compared to an expected one or more parameters thereof;

applying, on each image frame of the subset of image frames, a Fast Fourier Transform (FFT) to yield an FFT image of the respective image frame;

applying a high pass filter (HPF) on the FFT image of the respective image frame to yield a HPF image of the respective FFT image;

summing gray level of pixels of the HPF image of the respective HPF image, to yield a HPF gray level sum value of the respective HPF image;

determining whether the HPF gray level sum value of the respective HPF image is above an expected HPF gray level sum threshold;

determining whether the at least one variation is due to an external optical disturbance (EOD) of the optical sensor or due to a failure of the optical sensor; and indicating that the optical sensor is subjected to at least one of the EOD or the failure if the HPF graylevel sum value of mframe is below the expected HPF gray level sum threshold value.

9. The method of claim 8, further comprising:

detecting at least one variation of the HPF gray level sum value of the respective HPF image with respect to an expected HPF gray level sum value thereof;

identifying a pattern of the at least one variation of the HPF gray level sum value with respect to the expected HPF gray level sum value; and determining, based on the pattern, whether the at least one variation is due to the EOD or due to the failure of the optical sensor.

10. The method of claim 8, further comprising:

deposing the optical sensor on a locomotive of a train such that the optical sensor faces a direction of travel of the train;

analyzing at least some of the plurality of image frames; and detecting and identifying, in the analyzed image frames, rails and a potential obstacle on the rails or in a defined vicinity of the rails.

11. A method of performing built-in tests of optical sensors of an optical system, the method comprising:

receiving a plurality of image frames from an optical sensor;

detecting, in at least one image frame of a subset of image frames of the plurality of images, at least one variation in one or more parameters of the respective at least one image frame as compared to an expected one or more parameters thereof;

calculating a histogram of each image frame of the subset of sampled image frames to yield a histogram of the respective image frame;

detecting at least one variation in the histogram of the respective image frame with respect to an expected histogram thereof;

identifying a pattern of the at least one variation of the histogram of the respective image frame with respect to the expected histogram;

determining whether the at least one variation is due to an external optical disturbance (EOD) of the optical sensor or due to a failure of the optical sensor; and determining, based on the pattern, whether the at least one variation is due to the EOD or due to the failure of the optical sensor.

12. The method of claim 11, further comprising:

calculating a contribution of a specified object in the respective image frame to the histogram of the respective image frame;

detecting at least one variation of the contribution of the specified object to the histogram of the respective image frame with respect to an expected contribution thereof;

identifying a pattern of the at least one variation of the contribution of the specified object to the histogram of the respective image frame with respect to an expected contribution thereof; and determining, based on the pattern, whether the at least one variation is due to the EOD or due to the failure of the optical sensor.

13. A method of performing built-in tests of optical sensors of an optical system, the method comprising:

receiving a plurality of image frames from an optical sensor;

detecting, in at least one image frame of a subset of image frames of the plurality of images, at least one variation in one or more parameters of the respective at least one image frame as compared to an expected one or more parameters thereof;

applying a High Pass Filter on each image frame of the sampled image frames to yield a HPF image of the respective image frame;

summing a gray level of pixels of the respective HPF image that are above an expected HPF gray level threshold to yield a HPF gray level sum value of the respective HPF image;

detecting at least one variation of the HPF gray level sum value of the respective HPF image with respect to an expected HPF gray level sum value thereof;

identifying a pattern of the at least one variation of the HPF gray level sum value with respect to the expected HPF gray level sum value;

determining whether the at least one variation is due to an external optical disturbance (EOD) of the optical sensor or due to a failure of the optical sensor; and determining, based on the pattern, whether the at least one variation is due to the EOD or due to the failure of the optical sensor.

14. A method of performing built-in tests of optical sensors of an optical system, the method comprising:

receiving a plurality of image frames from an optical sensor;

detecting, in at least one image frame of a subset of image frames of the plurality of images, at least one variation in one or more parameters of the respective at least one image frame as compared to an expected one or more parameters thereof;

receiving a first image of a first subset of image frames of a first plurality of image frames generated by a first optical sensor of at least two sensors;

receiving a second image a second subset of image frames of a second plurality of images generated by a second optical sensor of the at least two sensors, wherein the second image frame corresponds to the first image frame;

scaling the first image frame and the second image frame to same dimensions and resolution to yield a first scaled image and a second scaled image;

applying a Fast Fourier Transform (FFT) on the first scaled image to yield a first scaled FFT image and to apply and FFT on the second scaled image to yield a second scaled FFT image;

determining a difference between the first scaled FFT image and the second scaled FFT image;

determining whether the difference between the first scaled FFT image and the second scaled FFT image is above an expected difference threshold;

determining whether the at least one variation is due to an external optical disturbance (EOD) of the optical sensor or due to a failure of the optical sensor; and determining, based on the difference and when the difference is above the expected difference threshold, which of the first optical sensor or the second optical sensor is subjected to the EOD or the failure.

* * * * *